(12) United States Patent
Yang et al.

(10) Patent No.: US 12,192,897 B2
(45) Date of Patent: Jan. 7, 2025

(54) POWER SAVING INDICATION METHOD, NETWORK SIDE DEVICE AND USER EQUIPMENT

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Zheng Zhao, Beijing (CN); Chen Luo, Beijing (CN); Lei Wang, Beijing (CN); Fangchen Cheng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 640 days.

(21) Appl. No.: 17/599,684

(22) PCT Filed: Mar. 25, 2020

(86) PCT No.: PCT/CN2020/081065
§ 371 (c)(1),
(2) Date: Sep. 29, 2021

(87) PCT Pub. No.: WO2020/200003
PCT Pub. Date: Oct. 8, 2020

(65) Prior Publication Data
US 2022/0201605 A1    Jun. 23, 2022

(30) Foreign Application Priority Data

Mar. 29, 2019   (CN) .......................... 201910253481.X
Apr. 11, 2019   (CN) .......................... 201910290651.1

(51) Int. Cl.
*H04B 7/185*    (2006.01)
*H04W 52/02*    (2009.01)
(Continued)

(52) U.S. Cl.
CPC ... *H04W 52/0216* (2013.01); *H04W 52/0229* (2013.01); *H04W 52/0235* (2013.01); *H04W 72/1263* (2013.01); *H04W 72/23* (2023.01)

(58) Field of Classification Search
CPC ......... H04W 52/0216; H04W 52/0229; H04W 52/0235; H04W 72/23; H04W 72/1263
(Continued)

(56) References Cited

U.S. PATENT DOCUMENTS

2018/0332655 A1* 11/2018 Ang .................. H04W 52/0216
2018/0368112 A1* 12/2018 Sebeni .................. H04W 72/23
(Continued)

FOREIGN PATENT DOCUMENTS

CN    104105186 A    10/2014
CN    109257823 A    1/2019
(Continued)

OTHER PUBLICATIONS

Chinese Office Action dated Jul. 23, 2021 for Chinese Application No. 201910290651.1.
(Continued)

*Primary Examiner* — Temica M Beamer
(74) *Attorney, Agent, or Firm* — Harness, Dickey & Pierce, P.L.C.

(57) ABSTRACT

The present disclosure provides a power saving indication method, a network side device and a user equipment, the power saving indication method includes configuring DCI, the DCI carries power saving information of at least one user equipment the power saving information is used to indicate at least one power saving scheme or a mapping relation between at least two power saving schemes.

20 Claims, 5 Drawing Sheets configuring downlink control information DCI    101

(51) Int. Cl.
*H04W 72/1263* (2023.01)
*H04W 72/23* (2023.01)

(58) Field of Classification Search
USPC .......................................................... 370/318
See application file for complete search history.

(56) References Cited

U.S. PATENT DOCUMENTS

| | | | |
|---|---|---|---|
| 2019/0053320 A1* | 2/2019 | Islam | ................ H04W 52/0229 |
| 2020/0314747 A1* | 10/2020 | Zhou | ................... H04W 52/143 |
| 2020/0322927 A1 | 10/2020 | Lin et al. | |
| 2021/0314864 A1 | 10/2021 | Xue et al. | |

FOREIGN PATENT DOCUMENTS

| | | |
|---|---|---|
| CN | 109417543 A | 3/2019 |
| EP | 3809778 A1 | 4/2021 |
| WO | WO-2019/032701 A1 | 2/2019 |

OTHER PUBLICATIONS

ZTE Microelectronics, "PDCCH procedure and DCI carried by PDSCH region", Agenda item 8.1.3.1.5, 3GPP TSG RAN WG1 Meeting #88, R1-1701588, Feb. 13-17, 2017, Athens, Greece.

Chinese Office Action dated Jan. 25, 2022 for Chinese Patent Application No. 20191029065.1.

Samsung, "On UE Power Savings", Agenda Item 7.3.1.5, 3GPP TSG RAN WG1 Meeting AH 1801, R1-1800446, Jan. 22-26, 2018, Vancouver, Canada.

Written Opinion and International Search Report dated Jun. 30, 2020 for International Application No. PCT/CN2020/081065.

Samsung, "On UE Power Savings", Agenda item 7.3.1.5, 3GPP TSG RAN WG1 Meeting 91, R1-1720324, Nov. 27-Dec. 1, 2017, Reno, USA.

CATT, "Summary of UE Power Saving Schemes", Agenda item 7.2.9.2, 3GPP TSG RAN WG1 #96, R1-1903483, Feb. 25-Mar. 1, 2019, Athens, Greece.

Qualcomm Incorporated, "Summary for UE Power Saving Evaluation", Agenda item 7.2.9.1, 3GPP TSG-RAN WG1 #96, R1-1903486, Feb. 25-Mar. 1, 2019, Athens, Greece.

Extended European Search Report dated Apr. 13, 2022 for Application No. EP 20783875.6.

ZTE, Sanechips, "Consideration on Power Saving Signal", Agenda Item 11.11.4.1, 3GPP TSG-RAN WG2 Meeting #105 bis, R2-1903396, Apr. 8-12, 2019, Xi'an, China.

Status Report to TSG, "Study on UE Power Saving in NR", 3GPP TSG RAN Meeting #83, RP-190630, Agenda item 9.3.5, Mar. 18-21, 2018, Shenzhen, China.

\* cited by examiner

POWER SAVING INDICATION METHOD, NETWORK SIDE DEVICE AND USER EQUIPMENT

CROSS-REFERENCE TO RELATED APPLICATIONS

This application is the U.S. national phase of PCT Application No. PCT/CN2020/081065 filed on Mar. 25, 2020, which claims a priority of the Chinese patent application No. 201910253481.X filed on Mar. 29, 2019, and a priority of the Chinese patent application No. 201910290651.1 filed on Apr. 11, 2019, which are incorporated herein by reference in its entirety.

TECHNICAL FIELD

The present disclosure relates to the field of communication technology, in particular to a power saving indication method, a network side device and a user equipment.

BACKGROUND

In UE power saving topic of NR R16 SI, power saving solution of indicating UE using Downlink control information (DCI)-based power saving signal/channel is proposed. The existing DCI format of NR includes following three major categories.

The first category: Group-common DCI for indicating information of a plurality of UE groups in a cell, and a bit field is used for indicating information including dynamic uplink frame structure Slot Format indicator (SFI) indication information, Pre-emption indication (PI) indication information, Physical uplink Control channel (PUCCH), Physical uplink shared channel (PUSCH), Transmit Power Control (TPC) commands information of Sounding reference Signal (SRS). In the standard, DCI format 2-0, DCI format 2-1, DCI format 2-2, and DCI format 2-3, the DCI format 2 series are used for transmitting control information of a group of UEs.

The second category: Broadcast DCI (DCI for scheduling Broadcast Information) for indicating scheduling Information of all UEs in a cell includes DCI format 0-0 for uplink scheduling and DCI format 1-0 for downlink scheduling. Only basic scheduling information is needed for the DCI for scheduling Broadcast Information to ensure high reliability, so the method in the LTE System is practically reused for the method of processing DCI used for scheduling System Information (SI), Paging and Random Access (RA), i.e., the data is scheduled using DCI format 1-0.

DCI format 2-0 is used to transmit the slot structure indication information, and the payload size of DCI can be configured with a maximum length of 128 bits by higher layer signaling. A plurality of SFI information can be included and the corresponding SFI index of the UE is indicated by higher layer signaling. The Cyclic Redundancy Check (CRC) of DCI is scrambled by slot format indicator Radio network temporary identifier (SFI-RNTI).

DCI format 2-1 is used for transmitting PI information. The base station can also configure its payload size with a maximum length of 126 bits via higher layer signaling. A plurality of PI indication information may be included. The PI index corresponding to the UE is indicated via higher layer signaling. The CRC of the DCI format is scrambled by the Initial Radio network temporary identifier (INT-RNTI).

DCI format 2-2 is used to transmit power control information of PUSCH or PUCCH, when the CRC thereof is scrambled by the Transmit power control (TPC)-PUSCH-RNTI, the power control information of PUSCH is informed, and when the CRC thereof is scrambled by the TPC-PUCCH-RNTI, the power control information of PUCCH is informed. A plurality of TPC indication information may be included, when the length thereof is smaller than DCI format 1-0 in the initial Downlink Bandwidth partial (DL BWP), adding is necessary.

DCI format 2-3 is used for power control of SRS and SRS request, the CRC thereof is scrambled by the TPC-SRS-RNTI. A plurality of information blocks is included, and the corresponding information blocks of the UE are indicated by high layer signaling. When the length thereof is smaller than DCI format 1-0 in the initial DL BWP, the same size needs to be obtained by padding.

The third category: UE-specific DCI, the bit field is used for indicating scheduling information of each UE in a cell, including non-back DCI format 0-1, 1-1.

However, at present, there is no specific design of DCI for power saving information indication.

SUMMARY

The embodiments of the present disclosure provide a power saving indication method, a network side device, a user equipment for implement the specific design of DCI for power saving information indication.

An embodiment of the present disclosure also provides a saving indication method, including: configuring downlink control information (DCI), the DCI carries power saving information of at least one user equipment (UE), the power saving information is used to indicate at least one power saving scheme or a mapping relation between at least two power saving schemes.

An embodiment of the present disclosure also provides a power saving indication method, includes: receiving DCI sent by a network side, wherein the DCI carries power saving information of at least one UE, the power saving information is used to indicate at least one power saving scheme or a mapping relation between at least two power saving schemes.

An embodiment of the present disclosure also provides a network side device, includes: a first configuration module, configured to configure, wherein the DCI carries power saving information of at least one UE, the power saving information is used to indicate at least one power saving scheme or a mapping relation between at least two power saving schemes.

An embodiment of the present disclosure also provides a user equipment (UE), includes: a receiving module, configured to receive DCI sent by a network side, wherein the DCI carries power saving information of at least one UE, the power saving information is used to indicate at least one power saving scheme or a mapping relation between at least two power saving schemes.

An embodiment of the present disclosure also provides a network side device, includes: a transceiver, a memory, a processor, and a computer program stored on the memory and executed by the processor to perform the step of: configuring DCI, wherein the DCI carries power saving information of at least one UE, the power saving information is used to indicate at least one power saving scheme or a mapping relation between at least two power saving schemes An embodiment of the present disclosure also provides a UE, includes a transceiver, a memory, a processor, and a computer program stored on the memory and executed by the processor to perform the step of: receiving a DCI send by a network side, wherein the DCI carries power saving information of at least one UE, the power saving information is used to indicate at least one power saving scheme or a mapping relation between at least two power saving schemes.

An embodiment of the present disclosure also provides a power saving indication method, includes: configuring time window information for skipping monitoring PDCCH, wherein the time window information is used to instruct a UE to skip monitoring the PDCCH in a target time period, the target time period is in a duration from a channel state information request to a channel state information acquisition; sending the time window information to the UE An embodiment of the present disclosure also provides a power saving indication method, incudes: receiving time window information configured by a network side device to skip monitoring PDCCH, wherein the time window information is used to instruct a UE to skip monitoring the PDCCH in a target time period, the target time period is in a duration from a channel state information request to a channel state information acquisition; and performing a power saving operation in accordance with the time window information.

An embodiment of the present disclosure also provides a network side device, includes: a configuring module, configured to configure time window information for skipping monitoring PDCCH, wherein the time window information is used to instruct a UE to skip monitoring the PDCCH in a target time period, the target time period is in a duration from a channel state information request to a channel state information acquisition; and a sending module, configured to send the time window information to the UE An embodiment of the present disclosure also provides a UE, includes: a receiving module, configured to receive time window information configured by a network side device to skip monitoring PDCCH, wherein the time window information is used to instruct a UE to skip monitoring the PDCCH in a target time period, the target time period is in a duration from a channel state information request to a channel state information acquisition; and a power saving module, configured to perform a power saving operation in accordance with the time window information An embodiment of the present disclosure also provides a network side device, includes: a transceiver, a memory, a processor, and a computer program stored on the memory and executed by the processor to perform the step of: configuring time window information for skipping monitoring PDCCH, wherein the time window information is used to instruct a UE to skip monitoring the PDCCH in a target time period, the target time period is in a duration from a channel state information request to a channel state information acquisition; sending the time window information to the UE An embodiment of the present disclosure also provides a UE, includes: a transceiver, a memory, a processor, and a computer program stored on the memory and executed by the processor to perform the step of: receiving time window information configured by a network side device to skip monitoring PDCCH, wherein the time window information is used to instruct a UE to skip monitoring the PDCCH in a target time period, the target time period is in a duration from a channel state information request to a channel state information acquisition; and performing a power saving operation in accordance with the time window information.

An embodiment of the present disclosure also provides a computer readable storage medium with a computer program stored thereon, when executed by a processor, the computer program implement the above power saving indication method.

The beneficial effects of the embodiments of the present disclosure are:

A specific design of DCI for an power saving information indication is achieved by carrying power saving information of at least one UE on DCI and indicating the power saving information for indicating one power saving scheme or a mapping relation between two power saving schemes.

BRIEF DESCRIPTION OF THE DRAWINGS

To illustrate the technical solutions of the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still obtain other drawings from these accompanying drawings without creative work.

DETAILED DESCRIPTION

Figure 1:
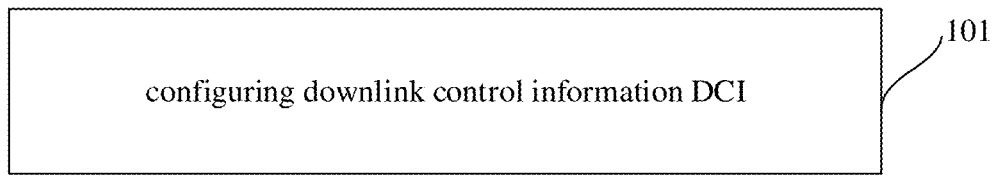
FIG. 1 shows a flow chart of a power saving indication method of a first embodiment of the present disclosure.

To further clarify the technical problems, technical solutions, and advantages of the present disclosure, a detailed description is set forth below with reference to the accompanying drawings and specific embodiments. In the following description, specific details such as specific configurations and components are provided solely to facilitate a thorough understanding of the embodiments of the present disclosure. Accordingly, it will be apparent to one skilled in the art that various changes and modifications may be made to the embodiments described herein without departing from the scope and spirit of the present disclosure. Additionally, descriptions of well-known functions and constructions may be omitted for clarity and conciseness.

It is to be understood that "one embodiment" or "an embodiment" throughout the specification means that a particular feature, structure, or characteristic described in connection with the embodiment is included in at least one embodiment of the present disclosure. Thus, the appearances of the phrases "in one embodiment" or "in an embodiment" throughout the specification are not necessarily referring to the same embodiment. Furthermore, the particular features, structures, or characteristics may be combined in any suitable manner in one or more embodiments.

In various embodiments of the present disclosure, it should be understood that the value of sequence quantitys of the processes described below does not imply a sequential order of execution, and the order of execution of the processes should be determined by the function and internal logic of the processes, and should not be construed as limiting the embodiments of the present disclosure.

Additionally, the terms "system" and "network" are often used interchangeably herein.

In the embodiments provided by the present disclosure, it should be understood that "B corresponding to A" means that B is associated with A, and B can be determined from A. However, it should also be understood that determining B from A does not mean determining B from A alone, and B can also be determined from A and/or other information.

In an embodiment of the present disclosure, the access network is in a form of, but not limited to, a Macro Base Station, a Pico Base Station, a Node B (3G Mobile Station), an enhanced Base Station (eNB), a gNB (5G Mobile Station), a Home enhanced Base Station (Femto eNB or Home eNode B or Home eNB or HeNB), a relay Station, an access point, a Remote Radio Unit (RRU), a Remote Radio Head (RRH), etc. the user terminal can be a mobile phone (or handset) or other device capable of transmitting or receiving wireless signals, including a UE, a Personal Digital Assistant (PDA), a wireless modem, a wireless communication device, a handheld device, a laptop computer, a cordless phone, a Wireless Local Loop (WLL) Station, a Customer Premise Equipment (CPE) capable of converting mobile signals to WiFi signals, or a mobile smart hotspot, a smart appliance, or other device capable of autonomously communicating with a mobile communication network without human operation, etc.

First Embodiment

Embodiments of the present disclosure provide a power saving indication method, applied to a network side device that implements a specific design of DCI for power saving information indication.

As shown in FIG. 1, the power saving indication method of the embodiment of the present disclosure specifically includes the following steps.

Step 101: configuring DCI.

The DCI carries power saving information of at least one UE, the power saving information being used to indicate at least one power saving scheme or a mapping relation between at least two power saving schemes.

The information field in the DCI for identifying power saving information may include E fields, each field represents power saving information of at least one UE, and each field contains 0 to H bits indicating power saving information, E and H are positive integers.

The power saving scheme indicated by the power saving information may be statically configured, or semi-statically configured, or dynamically configured. In particular, it may be predefined, RRC signaling configured, MAC-CE configured, or layer one signaling/channel configured. The layer one signaling/channel may be physical layer signaling/channel, or configured based on downlink control information indication.

The static configuration is preset. The semi-static configuration may be based on RRC signaling, MAC-CE, and the dynamic configuration may be based on layer one signaling/channel configuration.

The power saving information is used to indicate the categories of the power saving scheme, which can be all or part of categories of the power saving schemes configured by the base station.

In the embodiments of the present disclosure, a specific design of DCI for an power saving information indication is achieved by carrying power saving information of at least one UE on DCI and indicating the power saving information for indicating one power saving scheme or a mapping relation between two power saving schemes.

Optionally, after configuring the DCI, the method further includes: scrambling the DCI; and sending the scrambled DCI to the UE.

When the DCI carrying the power saving indication information is scrambled, a new defined Radio Network Temporary Identity (RNTI) or an existing RNTI may be used for scrambling.

The DCI includes power saving information for at least one UE, the quantity of specific UEs may be determined by the base station by grouping according to certain criteria, e.g. QoS requirements, QCI, service type, other grouping configurations of UEs are not defined herein. Further, DCI in different groups are scrambled with different RNTI.

Optionally, the power saving scheme includes at least one of the following:

a first power saving scheme of configuring to wake up and monitor physical layer downlink control channel (PDCCH);

a second power saving scheme of configuring to sleep and not monitor PDCCH; a third power saving scheme of configuring to monitor a first preset quantity of PDCCH time units;

a fourth power saving scheme of configuring to skip monitoring a second preset quantity of PDCCH time units;

a fifth power saving scheme of configuring to sleep a secondary serving cell; a sixth power saving scheme of configuring bandwidth part (BWP);

a seventh power saving scheme of configuring multi-carrier;

an eighth power saving scheme of configuring discontinuous reception;

a ninth power saving scheme of configuring PDCCH aggregation levels;

a tenth power saving scheme of configuring PDCCH control resource sets;

an eleventh power saving scheme of configuring PDCCH search spaces;

a twelfth power saving scheme of configuring radio resource management (RRM);

a thirteenth power saving scheme of configuring channel state information (CSI);

a fourteenth power saving scheme of configuring a slot format indication (SFI); a fifteenth power saving scheme of configuring time-domain adaptive power adjustment; or a sixteenth power saving scheme of configuring spatial-domain adaptive power adjustment.

As can be seen from the above, the power saving scheme of the UE includes a frequency domain power saving scheme/a time domain power saving scheme/a quantity of antennas adjustment scheme adjusted with the service characteristics, a DRX adjustment scheme adjusted with the service characteristics, a power saving scheme to reduce the monitoring and decoding of the PDCCH, a power saving scheme with reduced RRM measurements, etc. The power saving scheme can be triggered or indicated by a power saving signal/channel, including a Reference Signal based on an existing signal/channel, a PDCCH channel, a Tracking Reference Signal (TRS), a Channel-State Information Reference Signal (CSI-RS) type, a Synchronization Signal-like (SS-like) Reference Signal, and a Demodulation Reference Signal (DMRS), and a new power saving signal/channel, e.g., based on a sequence.

Optionally, the DCI includes DCI in one format, or DCI in at least two formats, and different power saving information is carried in different formats of DCI. That is, the power saving information for indicating different power saving schemes can be carried on one DCI or on multiple DCI. That is, the indication information of one power saving scheme can be carried on one DCI, and the indication information of different power saving schemes can be carried on different DCI.

Optionally, when the DCI includes DCI in at least two formats, the scrambling of the DCI includes scrambling different formats using different radio network temporary identities (RNTIs), respectively. That is, different RNTIs are used for scrambling to distinguish different DCI.

Optionally, the DCI further includes a DCI format identifier for identifying a type of power saving scheme indicated by the power saving information.

The type of DCI may then be distinguished according to the type of power saving scheme indicated by the power saving information carried in the DCI, wherein the power saving information carried in different DCI is different, i.e. different DCI carries indication information of different power saving schemes or indication information of a mapping relation between different power saving schemes. The type of DCI may then be at least one of DCI used for waking up power saving information (i.e. waking up and monitoring PDCCH), DCI used for sleeping power saving information (i.e. sleeping and not monitoring PDCCH), DCI used for DRX adjustment of power saving information, DCI used for BWP switching of power saving information, DCI used for carrier activation/deactivation of power saving information (i.e. configuring multi-carrier), DCI used for RRM of power saving information, DCI used for CSI feedback of power saving information, DCI used for SFI indication of power saving information, or DCI used for dormant secondary serving cell indication of power saving information. It should be noted that these are only exemplary of DCI types, i.e. DCI types include other types not listed here.

In addition, when the information field identified by the DCI format is zero bit, the DCI format may be one, and it is not necessary to identify multiple DCI formats. The DCI format may be a predefined format type, e.g., DCI first format, representing power saving information for wake-up, DCI second format, representing power saving information for sleep, DCI third format, representing power saving information for DRX adjustment function, DCI fourth format, representing power saving information for BWP switch, DCI fifth format, representing power saving information for carrier activation/deactivation, DCI sixth format, representing power saving information for RRM power saving, DCI seventh format, representing power saving information for CSI feedback, DCI eighth format, representing power saving information for SFI indication, DCI ninth format, representing power saving information for dormant secondary serving cell index indication. When the information field identified by the DCI format is larger than zero bit, multiple DCI formats may be represented, e.g., 1 bit may represent whether the DCI format type is for waking up and monitoring PDCCH or sleeping and not monitoring PDCCH. Specific representations are shown in, for example, Table 1 and Table 2.

TABLE 1

| first method of bit field information indicating DCI type | |
|---|---|
| 0 | Sleep function identifier |
| 1 | Wake-up function identifier |

TABLE 2

| second method of bit field information indicating DCI type | |
|---|---|
| 0 | Wake-up function identifier |
| 1 | Insomnia function identifier |

Optionally, when the power saving scheme includes a first power saving scheme to configure waking up and monitoring PDCCH, the power saving information includes information indicating waking up and monitoring the PDCCH in a preset time period.

Optionally, the preset time period includes at least one discontinuous reception cycle, or an activation time period or a partial time period of discontinuous reception, or at least one PCDDH time unit in the activation time period of the discontinuous reception.

The time unit may be a symbol, a slot, a radio-frame, a time position of PDCCH monitoring position (MO), wherein the quantity of PDCCH time units may be predefined, configured by RRC signaling, configured by MAC-CE.

In particular, when the information bit field for indicating the first power saving scheme is 0 bit, it means that wake-up function the power saving signal is not supported, i.e. the first power saving scheme is not configured for the UE.

The information bit field for indicating the first power saving scheme is 1 bit for indicating whether or not to wake up within a time window indicated by the power saving information, in particular, the time window may identify any of the three cases as follows.

Figure 7:
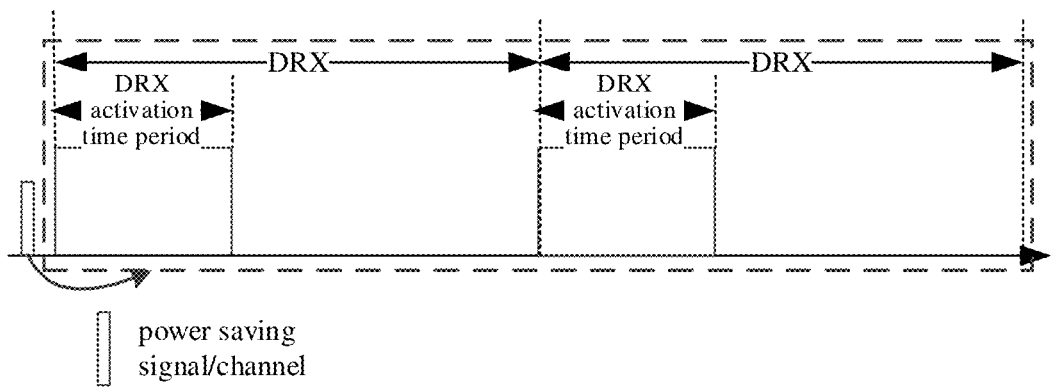
FIG. 7 shows a first schematic diagram of a preset time period of an the embodiment of the present disclosure.

Case 1: As shown in FIG. 7, it indicates whether to wake up the UE in at least one following Discontinuous Reception (DRX) cycle. In this case, the UE is able to perform downlink information reception and uplink information transmission during the DRX active time.

Figure 8:
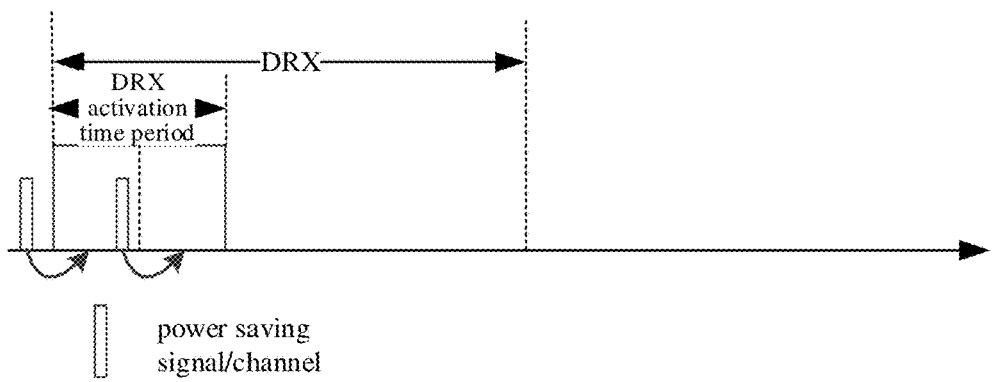
FIG. 8 shows a second schematic diagram of a preset time period of an the embodiment of the present disclosure.

Case 2: As shown in FIG. 8, it is indicated whether to wake up the UE during an active period for indicating a subsequent discontinuous reception (DRX-active). The DRX-active period or a part of the period may be referred to as an active window of wake-up information, the UE is to wake up or sleep as indicated by the wake-up information during the period. The active window of wake-up information (i.e. the above-mentioned preset time period) may be a static/semi-static signaling configured by RRC and may be a signaling configured by Medium access control-control element (MAC-CE).

Figure 9:
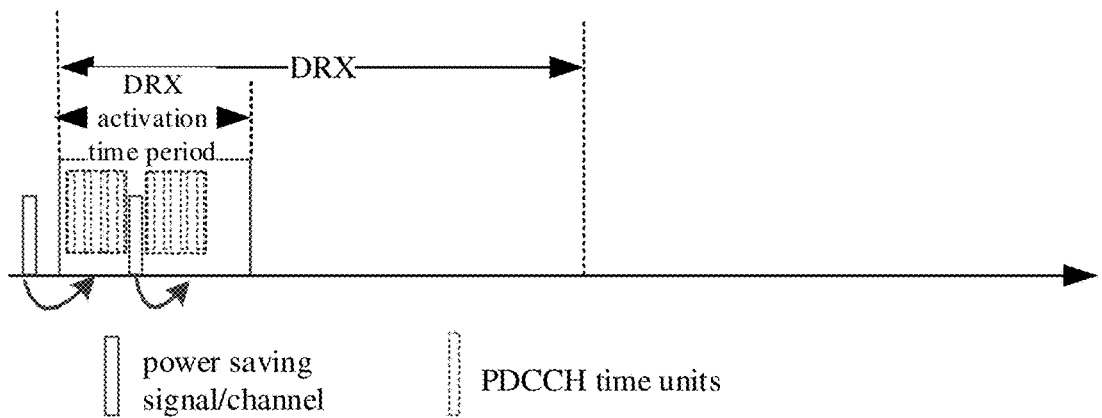
FIG. 9 shows a third schematic diagram of a preset time period of an the embodiment of the present disclosure.

Case 3: As shown in FIG. 9, it is indicated whether to wake up the UE in at least one PDCCH time unit in DRX-active.

The waking up means that the UE may receive and/or send data in the DRX active time; the sleeping means that the UE may skip receiving and/or sending data in the DRX active time.

Further, when the information bit field for indicating the first power saving scheme is 1 bit, for example, it is indicated that the PDCCH can be monitored or not monitored, as shown in Table 3 and Table 4.

TABLE 3

| first method of bit field information indicates to wake up the UE | |
|---|---|
| 0 | UE may not monitor PDCCH |
| 1 | UE monitors PDCCH |

TABLE 4

| second method of bit field information indicates to wake up the UE | |
|---|---|
| 0 | UE monitors PDCCH |
| 1 | UE may not monitor PDCCH |

Optionally, when the power saving scheme includes a second power saving scheme for configuring sleeping and not monitoring PDCCH, the power saving information includes information of sleeping and not monitoring PDCCH in a preset time period.

Optionally, the preset time period includes at least one discontinuous reception cycle, or an activation time period or a partial time period of discontinuous reception, or at least one PCDDH time unit in the activation time period of the discontinuous reception.

In particular, when the information bit field for indicating the second power saving scheme is 0 bit, it means that the sleep function of the power saving signal is not supported, i.e., the second power saving scheme is not configured for the UE.

The information bit field used to indicate the second power saving scheme is 1 bit, and is used to identify any of the three following cases.

Case 1: As shown in FIG. 7, it indicates whether the UE is sleep in at least one following Discontinuous Reception (DRX) cycle. In this case, the UE is able to perform downlink information reception and uplink information transmission during the DRX active time.

Case 2: As shown in FIG. 8, it is indicated whether the UE is sleep during an active period for indicating at least one subsequent discontinuous reception (DRX-active). The DRX-active period or a part of the period may be referred to as an active window of wake-up information, the UE is to wake up or sleep as indicated by the wake-up information during the period. The active window of wake-up information (i.e. the above-mentioned preset time period) may be a static/semi-static signaling configured by RRC and may be a signaling configured by Medium access control-control element (MAC-CE).

Case 3: As shown in FIG. 9, it is indicated whether to UE is sleep in at least one PDCCH time unit in DRX-active. The time unit may be a symbol, a slot, a radio-frame, a time position of PDCCH monitoring location (MO), and the quantity of PDCCH time units may be predefined, configured by RRC signaling, configured by MAC-CE. As shown in the following figures in detail, other mapping relations are not described in more detail. The unused bit field is reserved.

Furthermore, when the information bit field for indicating the first power saving scheme is 1 bit, for example, it is indicated that the PDCCH can be monitored or not monitored, as detailed in Tables 5 and 6.

TABLE 5

| first method of bit field information indicates UE to sleep | |
|---|---|
| 0 | UE may not monitor the PDCCH, i.e., the UE may sleep |
| 1 | The UE monitors the PDCCH, i.e. the UE cannot sleep |

TABLE 6

| second method of bit field information indicates UE to sleep | |
|---|---|
| 0 | The UE monitors the PDCCH, i.e. the UE cannot sleep |
| 1 | The UE may not monitor the PDCCH, i.e., the UE may sleep |

Optionally, when the power saving scheme includes a third power saving scheme configured to monitor the first preset quantity of PDCCH time units, the power saving information includes information indicating to monitor the first preset quantity of PDCCH time units within a preset time period; or the power saving information includes at least one of or indication information indicating a mapping relation between at least two of: the first preset quantity, an index of PDCCH time units to be monitored, a start position of a PDCCH time unit to be monitored, a time offset of a PDCCH time unit to be monitored relative to the start position; or the power saving information includes an end position of the PDCCH time unit to be monitored and at least one of, or indication information indicating a mapping relation between the end position of the PDCCH time unit to be monitored and the at least one of: the first preset quantity, an index of PDCCH time units to be monitored, a start position of a PDCCH time unit to be monitored, and a time offset of a PDCCH time unit to be monitored relative to the start position. PDCCH time units may be downlink, uplink, flexible, and not limited in detail.

Where M bits are used to indicate the monitoring of N (i.e. a first preset quantity) PDCCH time units, M is greater than or equal to 1 bit, N is greater than or equal to 1, M is a value determined depending on the quantity N of PDCCH monitoring time units, and/or the periodicity, and/or a first DRX mapping relation, where the values of N and M may be the same or different; the configuration of M may be predetermined and may be configured by a higher layer signaling, such as RRC signaling, MAC-CE; the value of N may be predetermined and may be configured by a higher layer signaling, such as RRC signaling, MAC-CE; and the first DRX mapping relation indicates time relation between power saving information carrying the identifier of the time units monitoring the N PDCCHs and the DRX, for example, the power saving information carrying the identifier of the time units monitoring the N PDCCHs is sent before the DRX-active time units, or the power saving information carrying the identifier of the time units monitoring the N PDCCHs is sent at the first one of the DRX-active time units; or the power saving information carrying the identifier of the time units monitoring the N PDCCHs is sent during the DRX-active time units.

In particular, when M equals to 1 bit, it means to trigger the monitoring of N PDCCH time units in a preset time period, i.e. that N PDCCH units to be monitored are distributed in the preset time period. In particular, the preset time period includes at least one discontinuous reception cycle, or activation time period or a partial time period of discontinuous reception, or at least one PDCCH time unit in an activation time period of discontinuous reception.

When M is greater than or equal to 1 bit, the information field of Mbit may also indicate the following information: at least one of a quantity of PDCCH time units to be monitored, an index of the PDCCH time units to be monitored, a start position of the PDCCH time units to be monitored, or a time offset of the PDCCH time units to be monitored from the start position, or a mapping relationship between at least two; or The end position of the PDCCH time unit to be monitored and at least one of, or indication information indicating a mapping relation between the end position of the PDCCH time unit to be monitored and the at least one of: a quantity of PDCCH time units to be monitored, an index of the PDCCH time unit to be monitored, a starting position of the PDCCH time unit to be monitored, a time offset of the PDCCH time unit to be monitored relative to the starting position.

By way of specific example, it may be at least one of: a maximum quantity of PDCCH time units to be monitored may be expressed as: max $\{2^M, N\}$PDCCH time units, max $\{\ \}$ denotes the maximum value of a plurality of elements by a mathematical operation; or a mapping relation between the quantity of PDCCH time units to be monitored and the PDCCH time unit index may be expressed.

Where M=4 bits, information indicated by the information filed of 4-bit is shown by way of example in Tables 7 and 8.

TABLE 7 bit field information indicates the quantity of PDCCH time units to be monitored by UE

| | |
|---|---|
| 0000 | UE monitors 0 PDCCH time unit, i.e. UE skips monitoring the PDCCH time units |
| 0001 | UE monitors 1 PDCCH time unit |
| 0010 | UE monitors 2 PDCCH time units |
| 0011 | UE monitors 3 PDCCH time units |
| 0100 | UE monitors 4 PDCCH time units |
| 0101 | UE monitors 5 PDCCH time units |
| 0110 | UE monitors 6 PDCCH time units |
| 0111 | UE monitors 7 PDCCH time units |
| 1000 | UE monitors 8 PDCCH time units |
| 1001 | UE monitors 9 PDCCH time units |
| 1010 | UE monitors 10 PDCCH time units |
| 1011 | UE monitors 11 PDCCH time units |
| 1100 | UE monitors 12 PDCCH time units |
| 1101 | UE monitors 13 PDCCH time units |
| 1110 | UE monitors 14 PDCCH time units |
| 1111 | UE monitors 15 PDCCH time units |

TABLE 8 bit field information indicates the relation between the quantity of PDCCH time units to be monitored by the UE with the index of PDCCH time unit

| Mapping relation indication | Quantity of PDCCH time units | Index of PDCCH time unit |
|---|---|---|
| 0000 | 1 | 1 |
| 0001 | 1 | 32 |
| 0010 | 2 | 2, 4 |
| 0011 | 3 | 2, 4, 6 |
| 0100 | 3 | 33, 34, 35 |
| 0101 | 4 | 1, 2, 3, 4 |
| 0110 | 4 | 10, 20, 30, 40 |
| 0111 | 5 | 11, 12, 13, 14, 15 |
| 1000 | 6 | 32, 33, 34, 35, 36, 37, |
| 1001 | 7 | 32, 33, 34, 35, 36, 37, 38 |
| 1010 | 8 | 0, 5, 10, 15, 20, 25, 30, 35, 40, 45 |
| 1011 | 9 | 0, 3, 6, 9, 12, 15, 18, 21, 24 |
| 1100 | 10 | 0, 3, 6, 9, 12, 15, 18, 21, 24, 27 |
| 1101 | 16 | 1, 2, 3, 7, 8, 9, 10, 11, 12, 13, 14, 15, 16, 17, 18, 19 |
| 1110 | 16 | 1, 2, 3, 4, 5, 6, 7, 8, 30, 31, 32, 33, 34, 35, 36, 37 |
| 1111 | | Reserved |

Optionally, when the power saving scheme includes a fourth power saving scheme configured to skip monitoring the second preset quantity of PDCCH time units, the power saving information includes information indicating skipping monitoring the second preset quantity of PDCCH time units during a preset time period; or The power saving information includes at least one of or indication information indicating a mapping relation between at least two of: a second preset quantity, an index of PDCCH time unit to be skipped monitoring, a start position of a PDCCH time unit to be skipped monitoring, a time offset of a PDCCH time unit to be skipped monitoring relative to the start position; or The power saving information includes an end position of a PDCCH time unit to be skipped monitoring and at least one of: or indication information indicating a mapping relation between the end position of the PDCCH time unit to be skipped monitoring and at least one of: a second preset quantity, an index of PDCCH time units to be skipped monitoring, a start position of a PDCCH time unit to be skipped monitoring, and a time offset of a PDCCH time unit to be skipped monitoring relative to the start position. The PDCCH time units may be downlink, uplink, flexible, and is not limited in particular.

Where K bits are used to indicate that L (i.e. a second preset quantity) PDCCH time units are skipped, L is greater than or equal to 1 bit, L is greater than or equal to 1, and K bits is determined depending on the quantity L of PDCCH time units to be skipped monitoring, and/or the periodicity, and/or a second DRX mapping relation, values of K and L may be the same or different; the second DRX mapping relation indicates the time relation between the power saving information carrying the identifier of L PDCCH time units to be skipped monitoring and DRX, e.g. the power saving information carrying the identifier of L PDCCH time units to be skipped monitoring is sent before the DRX-active time unit, or the power saving information carrying the identifier of L PDCCH time units to be skipped monitoring is sent in the first one of DRX-active time units, or the power saving information carrying the identifier of L PDCCH time units to be skipped monitoring is sent during the DRX-active time unit.

In particular, when K equals to 1 bit, it can trigger skipping monitoring of the L PDCCH time units in a preset time period, i.e. that the L PDCCH units to be monitored are distributed in the preset time period. In particular, the preset time period includes at least one of the non-consecutive reception cycle, or an activation time period or a partial time period of non-consecutive reception, or at least one PDCCH time unit in an activation time period of non-consecutive reception.

When K is greater than or equal to 1 bit, this Kbit information field may also indicate the following information:

At least one of a quantity of PDCCH time units to be skipped monitoring, an index of the PDCCH time units to be skipped monitoring, a start position of a PDCCH time unit to be skipped monitoring, a time offset of a PDCCH time unit to be skipped monitoring relative to the start position, or a mapping relationship between at least two; or An end position of the PDCCH time units to be skipped monitoring and at least one of: or indication information indicating a mapping between the end position of the PDCCH time units to be skipped monitoring and the at least one of: a quantity of the PDCCH time units to be skipped monitoring, an index of the PDCCH time units to be skipped monitoring, a start position of the PDCCH time units to be skipped monitoring.

By way of specific example, it may be at least one of: the maximum quantity of PDCCH time units to be skipped monitoring may be expressed as: max $\{2^K, L\}$ PDCCH time units, max $\{\ \}$ denotes the maximum value of a plurality of elements by a mathematical operation; or the mapping relation between the quantity of PDCCH time units to be skipped monitoring and the PDCCH time unit index.

Where M=4 bits, the information indicated by 4-bit information field is shown by way of example in Tables 9 and 10

TABLE 9 bit field information indicates that a user equipment is skipping to monitor PDCCH time units

| | |
|---|---|
| 0000 | UE skips monitoring 0 PDCCH time unit, i.e. UE continues to monitor PDCCH time units |
| 0001 | UE skips monitoring 1 PDCCH time unit |
| 0010 | UE skips monitoring 2 PDCCH time units |
| 0011 | UE skips monitoring 3 PDCCH time units |
| 0100 | UE skips monitoring 4 PDCCH time units |
| 0101 | UE skips monitoring 5 PDCCH time units |
| 0110 | UE skips monitoring 6 PDCCH time units |
| 0111 | UE skips monitoring 7 PDCCH time units |
| 1000 | UE skips monitoring 8 PDCCH time units |
| 1001 | UE skips monitoring 9 PDCCH time units |
| 1010 | UE skips monitoring 10 PDCCH time units |
| 1011 | UE skips monitoring 11 PDCCH time units |
| 1100 | UE skips monitoring 12 PDCCH time units |
| 1101 | UE skips monitoring 13 PDCCH time units |
| 1110 | UE skips monitoring 14 PDCCH time units |
| 1111 | UE skips monitoring 15 PDCCH time units |

TABLE 10 bit field information indicates the mapping relation between the quantity of PDCCH time units to be skipped monitoring by the UE and the index

| Mapping relation indication | Skipping monitoring the quantity of PDCCH time units | index of skipping monitoring PDCCH time unit |
|---|---|---|
| 0000 | 1 | 1 |

TABLE 10-continued bit field information indicates the mapping relation between the quantity of PDCCH time units to be skipped monitoring by the UE and the index

| Mapping relation indication | Skipping monitoring the quantity of PDCCH time units | index of skipping monitoring PDCCH time unit |
|---|---|---|
| 0001 | 1 | 32 |
| 0010 | 2 | 2, 4 |
| 0011 | 3 | 2, 4, 6 |
| 0100 | 3 | 33, 34, 35 |
| 0101 | 4 | 1, 2, 3, 4 |
| 0110 | 4 | 10, 20, 30, 40 |
| 0111 | 5 | 11, 12, 13, 14, 15 |
| 1000 | 6 | 32, 33, 34, 35, 36, 37, |
| 1001 | 7 | 32, 33, 34, 35, 36, 37, 38 |
| 1010 | 8 | 0, 5, 10, 15, 20, 25, 30, 35, 40, 45 |
| 1011 | 9 | 0, 3, 6, 9, 12, 15, 18, 21, 24 |
| 1100 | 10 | 0, 3, 6, 9, 12, 15, 18, 21, 24, 27 |
| 1101 | 16 | 1, 2, 3, 7, 8, 9, 10, 11, 12, 13, 14, 15, 16, 17, 18, 19 |
| 1110 | 16 | 1, 2, 3, 4, 5, 6, 7, 8, 30, 31, 32, 33, 34, 35, 36, 37 |
| 1111 | | reserved |

Optionally, when the power saving scheme includes a fifth power saving scheme to configure dormant secondary serving cells, the power saving information includes at least one of a quantity of dormant secondary serving cells or an index of the dormant secondary serving cells, or indication information indicating a mapping relation between the quantity of dormant secondary serving cells and the index of the dormant secondary serving cells.

Dormant secondary serving cell (Dormancy SCell) means that in the cell, CSI reporting by the UE is possible, including at least one of, in particular, Channel quality Indicator (CQI), Precoding matrix Indicator (PMI), Rank Indicator (RI), Precoding Type Indicator (PTI), CSI-RS resource Indicator, etc., on a local carrier without monitoring PDCCH.

Wherein, when the information domain for indicating the fifth power saving scheme for configuring Dormancy SCell is 0 bit, it is indicated that the Dormancy Scell is not configured;

When the information field for indicating the fifth power saving scheme for configuring Dormancy SCell is greater than or equal to 1 bit, it may be indicated to trigger a Dormancy Scell configuration, which may be predetermined, or configured by a higher layer signaling, for example, which may be configured by the RRC signaling, or MAC-CE. For example, the information field of X bits may be specifically indicated as at least one of the following: the maximum number of an index of Dormancy Scell with being $2^X$, or $2^X-1$; the maximum quantity of Dormancy Scells being $2^X$; the maximum number of mapping relation between the supported Dormancy S cell indexes and the quantity of Dormancy S cell being $2^X$, or $2^X-1$.

Specifically, for example, X=3 bits, the information indicated by 3-bit information field is shown in Tables 11, 12 and 13.

TABLE 11

| Bit field indicates Dormant Scell index | |
|---|---|
| 000 | Dormant Scell index is 0 |
| 001 | Dormant Scell index is 1 |

TABLE 11-continued

Bit field indicates Dormant Scell index

| | |
|---|---|
| 010 | Dormant Scell index is 2 |
| 011 | Dormant Scell index is 3 |
| 100 | Dormant Scell index is 4 |
| 101 | Dormant Scell index is 5 |
| 110 | Dormant Scell index is 6 |
| 111 | Dormant Scell index is 7 |

TABLE 12 bit field indicates the quantity of Dormant Scells

| | |
|---|---|
| 000 | The quantity of Dormant Scell is 1 |
| 001 | The quantity of Dormant Scell is 2 |
| 010 | The quantity of Dormant Scell is 3 |
| 011 | The quantity of Dormant Scell is 4 |
| 100 | The quantity of Dormant Scell is 5 |
| 101 | The quantity of Dormant Scell is 6 |
| 110 | The quantity of Dormant Scell is 7 |
| 111 | The quantity of Dormant Scell is 8 |

TABLE 13

X-bit field information indicates mapping relation between the quantity of Dormant Scells and index

| Dormant Scell indication | Quantity of Dormant Scell | Dormant Scell index |
|---|---|---|
| 000 | 1 | 1 |
| 001 | 2 | 1, 3 |
| 010 | 3 | 1, 16, 31 |
| 011 | 4 | 10, 11, 12, 13 |
| 100 | 5 | 1, 2, 3, 29, 30 |
| 101 | 6 | 1, 2, 3, 4, 5, 6 |
| 110 | 7 | 8, 9, 10, 11, 12, 24, 25 |
| 111 | 8 | 11, 12, 13, 14, 15, 16, 17, 18 |

Optionally, when the power saving scheme includes a sixth power saving scheme configuring the BWP, the power saving information includes at least one of a quantity of BWPs or index of the BWPs, or indication information indicating a mapping relation between the quantity of BWPs and the index of the BWPs.

The power saving scheme for configuring the BWP may, among others, represent at least one of the following: an indication of the maximum quantity of the activated BWPs, an index of the activated BWPs, or a mapping relation between the indexes of the simultaneously activated BWPs and the quantity of BWPs. The bit quantity Y of the information field representing the power saving scheme for configuring the BWP depends on the maximum quantity of the BWPs and/or the quantity of the simultaneously activated BWPs and/or the mapping relation between the indexes of the BWPs and the quantity of the simultaneously activated BWPs.

When the information field representing the power saving scheme for configuring BWP is 0 bit, it represents that BWP is not supported, it can also represent that it works on a certain fixed bandwidth.

When the information field representing the power saving scheme for configuring the BWP is Y bits and Y is greater than or equal to 1 bit, it may represent to trigger BWP configuration switching, the BWP configuration may be predetermined, configured by a higher layer signaling, for example RRC signaling or MAC-CE.

In particular, the information field configuration is Ybit, which may represent at least one of the following: the maximum number of BWP index being $2^Y$ or $2^Y-1$, where the number of BWP index may be predetermined, may be configured by higher layer signaling, for example RRC signaling, or MAC-CE; the maximum quantity of supported BWPs is $2^Y$; the maximum number of mapping relation between BWPs indexes and quantity being $2^Y$ or $2^Y-1$, wherein the relation between the BWP index and quantity may be predetermined, may be configured by higher layer signaling, configured by RRC semi-static or MAC-CE.

For example, when Y=2 bits, the information indicated by the 2 bits information field is shown in Tables 14, 15 and 16.

TABLE 14 bit field information indicates BWP index

| | |
|---|---|
| 00 | BWP index is 0 |
| 01 | BWP index is 1 |
| 10 | BWP index is 2 |
| 11 | BWP index is 3 |

TABLE 15 bit field information indicates quantity of BWPs

| | |
|---|---|
| 00 | The quantity of BWP is 1 |
| 01 | The quantity of BWPs is 2 |
| 10 | The quantity of BWPs is 3 |
| 11 | The quantity of BWPs is 4 |

TABLE 16 bit field information indicates mapping relation between quantity of BWPs and index

| BWP indication | BWP quantity | BWP index |
|---|---|---|
| 000 | 1 | 1 |
| 001 | 2 | 1, 3 |
| 010 | 3 | 1, 16, 31 |
| 011 | 4 | 10, 11, 12, 13 |
| 100 | 5 | 1, 2, 3, 29, 30 |
| 101 | 6 | 1, 2, 3, 4, 5, 6 |
| 110 | 7 | 8, 9, 10, 11, 12, 24, 25 |
| 111 | 8 | 11, 12, 13, 14, 15, 16, 17, 18 |

Optionally, when the power saving scheme includes a seventh power saving scheme configuring the multi-carriers, the power saving information includes at least one of a quantity of carriers or an index of the carriers or indication information indicating a mapping relation between the quantity of carriers and the index of the carriers.

Wherein the multi-carrier includes a carrier indicator and a dual connectivity. Specifically, the carrier indicator may be at least one of, specifically, an activated carrier, a deactivated carrier, and a dormancy carrier, wherein the UE may perform CSI reporting on the dormancy carrier, including CQI, PMI, RI, PTI, CRI, etc. on the present carrier without monitoring the PDCCH.

When an information field representing the power saving scheme for configuring a multi-carrier is 0 bit, it is represented that the multi-carrier is not supported.

When the information field representing the power saving scheme for configuring a multi-carrier is Z bits, and Z is greater than or equal to 1 bit, it may represent triggering of a multi-carrier configuration handover, which may be predetermined, which may be configured by higher layer signaling, e.g. RRC signaling, of MAC-CE.

In particular, the information field is configured as Zbits, which may represent at least one of the following: the maximum number of carrier index is $2^Z$ or $2^Z-1$, where the number of carrier index may be predetermined, may be configured by higher layer signaling, for example RRC signaling, or MAC-CE; the maximum quantity of supported carriers is $2^Z$; the maximum number of the mapping relation between the quantity of supported carriers and the index may be $2^Z$ or $2^Z-1$, wherein the mapping relation between the carrier index and the quantity may be predetermined, may be configured by higher layer signaling, RRC semi-static, MAC-CE.

For example, where Z=2 bits, the information indicated in 2-bit information field is shown in Tables 17, 18 and 19.

TABLE 17

Z-bit indicates Carrier index

| | |
|---|---|
| 000 | carrier index is 0 |
| 001 | carrier index is 1 |
| 010 | carrier index is 2 |
| 011 | carrier index is 3 |
| 100 | carrier index is 4 |
| 101 | carrier index is 5 |
| 110 | carrier index is 6 |
| 111 | carrier index is 7 |

TABLE 18

Z-bit indicates the quantity of Carriers

| | |
|---|---|
| 000 | The quantity of carrier is 1 |
| 001 | The quantity of carriers is 2 |
| 010 | The quantity of carriers is 3 |
| 011 | The quantity of carriers is 4 |
| 100 | The quantity of carriers is 5 |
| 101 | The quantity of carriers is 6 |
| 110 | The quantity of carriers is 7 |
| 111 | The quantity of carriers is 8 |

TABLE 19

Z bit field information indicates relationship between the quantity of carriers and index

| Carrier indicator indication | Quantity of carriers | Carrier number |
|---|---|---|
| 000 | 1 | 1 |
| 001 | 2 | 1, 3 |
| 010 | 3 | 1, 16, 31 |
| 011 | 4 | 10, 11, 12, 13 |
| 100 | 5 | 1, 2, 3, 29, 30 |
| 101 | 6 | 1, 2, 3, 4, 5, 6 |
| 110 | 7 | 8, 9, 10, 11, 12, 24, 25 |
| 111 | 8 | 11, 12, 13, 14, 15, 16, 17, 18 |

Optionally, when the power saving scheme includes an eighth power saving scheme configured for discontinuous reception, the power saving information includes at least one discontinuous reception configuration parameter or indication information indicating a mapping relation between at least two discontinuous reception configuration parameters.

The DRX configuration may include at least one of a DRX cycle, a DRX ondurationtimer, a DRX inactivity timer, other DRX related parameters, which is not limited herein. The DRX cycle may indicate the DRX cycle configuration, the DRX ondurationtimer may indicate a time window during which the UE is to receive downlink information and/or uplink information, and the DRX inactivity timer may indicate a time window during which the UE is to continue to receive downlink information and/or uplink information.

When the information field for representing DRX configuration is 0 bit, no DRX configuration aggregation is configured.

When the information field used to indicate the DRX configuration is R bits and R is greater than or equal to 1 bit, it may be indicated to trigger a DRX configuration switch, the DRX configuration may be predetermined, may be configured by higher layer signaling, for example, RRC signaling, MAC-CE.

Specifically, when R is greater than or equal to 1 bit, the maximum number of mapping relation of the DRX configuration or DRX parameter may be $2^R$ or $2^R-1$. For example, R=3 bits, and the mapping indication relationship is shown in Table 20. Other mapping relation and/or other values are not described in detail herein.

TABLE 20

R bit field information indicates mapping relation between at least one DRX parameter

| DRX configuration indication | DRX parameter set | | |
|---|---|---|---|
| | DRX cycle (ms) | DRX ondurationtimer | DRX activity timer (ms) |
| 000 | 40 | 4 | 10 |
| 010 | 160 | 8 | 80 |
| 011 | 320 | 10 | 80 |
| 100 | 320 | 10 | 100 |
| 101 | 1280 | 10 | 100 |
| 110 | 1280 | 20 | 200 |
| 111 | 2560 | 10 | 200 |

Optionally, when the power saving scheme includes a ninth power saving scheme configuring a PDCCH aggregation level, the power saving information includes at least one of a quantity of PDCCH aggregation levels or an index of the PDCCH aggregation level, or indication information indicating a mapping relation between the quantity of PDCCH aggregation levels and the index of the PDCCH aggregation level.

The PDCCH Aggregation Level (AL) is a positive integer and may include at least one value from the group {1, 2, 4, 8, 16}.

When the information domain for indicating PDCCH AL is configured to be 0 bit, it indicates that AL information is not configured.

When the information field used to indicate PDCCH AL is configured as A bits, and A is greater than or equal to 1 bit, it may be indicated that the AL configuration switch is triggered, the AL configuration may be preset, may be configured by higher layer signaling, for example, may be an RRC signaling configuration, may be a MAC-CE configuration.

In particular, when A is greater than or equal to 1 bit, it may represent at least one of the following: the maximum number of AL index being $2^A$ or $2^A-1$, wherein number of the AL index may be predetermined, may be configured by higher layer signaling, for example, RRC signaling, MAC-CE; the maximum quantity of ALs can be $2^A$; the maximum number of the mapping relation between the index of the AL and the quantity of the ALs may be given as $2^A$ or $2^A-1$, wherein mapping relation between the index of the AL and the quantity of ALs may be predetermined, may be configured by higher layer signaling, configured by RRC semi-static or MAC-CE.

Specifically, for example, A=3 bits, the information indicated by 3-bit information field is shown in Tables 21, 22, and 23.

TABLE 21

A-bit field information indicates AL index

| AL index indication | AL |
|---|---|
| 00 | 2 |
| 01 | 4 |
| 10 | 8 |
| 11 | 16 |

TABLE 22

A-bit field information indicates the quantity of ALs

| AL index indication | AL |
|---|---|
| 00 | 1 |
| 01 | 2 |
| 10 | 3 |
| 11 | 4 |

TABLE 23

A-bit field information indicates mapping relation between the index of the AL and the quantity of ALs

| Indication of AL | Indication of the quantity of ALs | AL |
|---|---|---|
| 0000 | 1 | 2 |
| 0001 | 2 | 2,4 |
| 0010 | 2 | 4,8 |
| 0011 | 2 | 8,16 |
| 0100 | 3 | 2,4,8 |
| 0101 | 3 | 4,8,16 |
| 0110 | 4 | 2,4,8,16 |
| 0111 | 1 | 4 |
| 0111 | 1 | 8 |
| 1000 | 1 | 16 |
| reserved | | |

Optionally, when the power saving scheme includes a tenth power saving scheme to configure PDCCH control resource set, the power saving information includes at least one of a quantity of PDCCH control resource sets and an index of the PDCCH control resource set or indication information indicating a mapping relation between the quantity of the PDCCH control resource sets and the index of PDCCH control resource set.

Wherein the PDCCH control resource set (CORESET) is configured to indicate a CORESET resource set for DCI, the CORESET resource set including at least one CORESET resource.

When the information field for indicating the configuration of the PDCCH CORESET is configured as 0 bit, it is indicated that the CORESET resource information is not configured.

When the information field used to indicate the PDCCH CORESET configuration is configured as B bits, and B is greater than or equal to 1 bit, it may be indicated to trigger the CORESET configuration switch. The CORESET configuration may be predetermined, may be configured by higher layer signaling, for example, RRC signaling or MAC-CE.

In particular, when B is greater than or equal to 1 bit, it may be expressed as at least one of: the maximum number of CORESET resource index is $2^B$ or $2^B-1$; the maximum quantity of CORESETs is $2^B$, the number of CORESET index corresponding to the quantity of CORESET index may be predetermined, may be configured by higher layer signaling, for example RRC signaling, MAC-CE; a mapping number of the association between CORESET index and quantity, the maximum mapping number being less than or equal to $2^B$, or $2^B-1$, wherein the association between CORESET index and quantity may be predetermined, may be configured by higher layer signaling, RRC semi-static configuration, MAC-CE.

Specifically, for example, B=3 bits, the information indicated by 3-bit information field is shown in Tables 24, 25 and 26.

TABLE 24

B bit field information indicates CORESET index

| CORESET resource indication | CORESET index |
|---|---|
| 00 | 0 |
| 01 | 1 |
| 10 | 2 |
| 11 | 3 |

TABLE 25

B bit field information indicates quantity of CORESET

| CORESET resource indication | quantity of CORESET resource set |
|---|---|
| 00 | 1 |
| 01 | 2 |
| 10 | 3 |
| 11 | 4 |

TABLE 26

B bit field information indicates mapping relation between the quantity of CORESTs with index

| CORESET indication | CORESET quantity indication | Number of CORESET resource |
|---|---|---|
| 0000 | 1 | 1 |
| 0001 | 1 | 2 |
| 0010 | 1 | 3 |
| 0011 | 1 | 4 |
| 0100 | 2 | 1,2 |
| 0101 | 2 | 3,4 |
| 0110 | 2 | 5,6 |
| 0111 | 3 | 1,2,3 |
| 0111 | 3 | 4,5,6 |
| 1000 | 3 | 1,2,3 |
| reserved | | |

Optionally, when the power saving scheme includes an eleventh power saving scheme configuring a PDCCH search space, the power saving information includes at least one of a quantity of PDCCH search spaces or an index of the PDCCH search space, or indication information indicating a mapping relation between the quantity of PDCCH search spaces and the index of the PDCCH search space.

Wherein a PDCCH Search Space (SS) indicates an SS resource set of DCI, the SS resource set includes at least one SS resource.

When the information field for indicating the SS configuration of PDCCH is configured as 0 bit, it is indicated that the SS resource information is not configured.

When the information field for indicating the SS configuration of PDCCH is configured as R bits, R is greater than or equal to 1 bit, it may be indicated that the PDCCH SS switch is triggered, and the configuration information of the PDCCH SS may be predefined, it may be configured by higher layer signaling, for example, RRC signaling, MAC-CE.

In particular, when R is greater than or equal to 1 bit, it may represent at least one of the following: the maximum SS resource index is $2^R$, or $2^R-1$; the maximum quantity of SSs is $2^R$, the number of SS indexes corresponding to the number of the SSs may be predetermined, may be configured by higher layer signaling, for example RRC signaling, MAC-CE; the maximum number of the mapping relation between SS index and quantity is $2^R$, or $2^R-1$, the association between SS index and quantity may be predetermined, configured by higher layer signaling configured, by RRC semi-static, MAC-CE.

Specifically, for example, R=3 bits, the information indicated by 3-bit information field is shown in Tables 27, 28, and 29.

TABLE 27 bit field information indicates SS index

| SS resource indication | SS index |
|---|---|
| 00 | 0 |
| 01 | 1 |
| 10 | 2 |
| 11 | 3 |

TABLE 28 bit field information indicates quantity of SS

| SS resource indication | Quantity of SS resource sets |
|---|---|
| 00 | 1 |
| 01 | 2 |
| 10 | 3 |
| 11 | 4 |

TABLE 29 bit field information indicates the association between SS indexes and quantity

| SS information indication | SS quantity indication | SS resource number |
|---|---|---|
| 0000 | 1 | 1 |
| 0001 | 1 | 2 |
| 0010 | 1 | 3 |
| 0011 | 1 | 4 |
| 0100 | 2 | 1,2 |
| 0101 | 2 | 3,4 |
| 0110 | 2 | 5,6 |
| 0111 | 3 | 1,2,3 |
| 0111 | 3 | 4,5,6 |
| 1000 | 3 | 1,2,3 |
| Others | | Reserved |

Optionally, when the power saving scheme includes a twelfth power saving scheme configured for radio resource management, the power saving information includes at least one of first radio resource management RRM indication information and second radio resource management RRM indication information, or third RRM indication information indicating a mapping relation between the first radio resource management RRM indication information and the second radio resource management RRM indication information, the first radio resource management RRM indication information is for indicating transmission of a RRM reference signal, the second radio resource management RRM indication information is for indicating RRM measurement within DCI valid range, the DCI valid range includes before receiving a next DCI notification, or a time window of a DCI indication, or a time window of a DCI indication configured by radio resource control RRC.

Wherein, when the information field for indicating Radio Resource Management (RRM) configuration is configured as 0 bit, it indicates that no RRM power saving information is configured.

When the information field used for indicating Radio Resource Management (RRM) configuration is configured as R bits, and R is greater than or equal to 1 bit, it may include at least one of, triggering the RRM power saving information including triggering of transmission of RRM measurement reference signals and/or whether RRM measurements are performed within the DCI valid range, the DCI valid range includes before receiving a next DCI notification, or within a time window of a DCI indication, or a time window of a DCI indication configured by radio resource control RRC.

Optionally, when the power saving scheme includes a thirteenth power saving scheme of configuring channel state information, CSI, the power saving information includes at least one of a quantity of CSI request power saving information and an index of the CSI request power saving information, or indication information indicating a mapping relation between the quantity of CSI request power saving information and the index of the CSI request power saving information, wherein the CSI request power saving information includes at least one of a CSI parameter set, a CSI resource set, a mapping relation between the CSI parameter set and the CSI resource set.

The CSI parameter set is a CSI reporting setting set that includes at least one of CQI, PMI, and CSI-RS indicator (CRI), Layer Indication (LI), and physical layer reference signal received power (L1-RSRP). The CSI resource set is the CSI resource setting set that includes at least one resource configuration of the at least one following parameter of non-zero power channel state information reference signal (NZP CSI-RS), zero power channel state information reference signal (ZP CSI-RS). The mapping relation between the CSI parameter set to the CSI resource set includes one-to-many mapping, or one-to-one mapping, between the CSI parameter set to the CSI resource set.

When the information field for representing the CSI configuration is configured as 0 bit, it is represented that CSI request power saving information is not configured.

When the information field for representing the CSI configuration is configured as a Q bit, Q is greater than or equal to 1 bit, it may represent triggering the configuration of CSI request power saving information.

In particular, when Q is greater than or equal to 1 bit, it may represent at least one of the following: the maximum number of the index of the CSI request power saving information is $2^Q$ or $2^Q-1$, wherein the number of the index of the CSI request power saving information may be predetermined, configured by higher layer signaling, for example RRC signaling, and MAC-CE; the quantity of CSI request power saving information may be a maximum of $2^Q$;

the mapping relation between the quantity of CSI request power saving information and the index may be predetermined, configured by a high level signaling, RRC semi-static configuration, MAC-CE.

Specifically, for example, Q=3 bits, the information indicated by 3-bit information field is shown in Tables 31, 32 and 33.

TABLE 31 bit field information indicates CSI request power saving information index

| CSI request power saving information resource indication | CSI request power saving information index |
|---|---|
| 00 | 0 |
| 01 | 1 |
| 10 | 2 |
| 11 | 3 |

TABLE 32 bit field information indicates the quantity of CSI request power saving information

| CSI request power saving information resource indication | Quantity of CSI requests |
|---|---|
| 00 | 1 |
| 01 | 2 |
| 10 | 3 |
| 11 | 4 |

TABLE 33 bit filed information indicates mapping relation between CSI request power saving information index and quantity

| CSI request power saving information indication | Quantity of CSI requests | CSI request energy-saving information index |
|---|---|---|
| 0000 | 1 | 1 |
| 0001 | 1 | 2 |
| 0010 | 1 | 3 |
| 0011 | 1 | 4 |
| 0100 | 2 | 1,2 |
| 0101 | 2 | 3,4 |
| 0110 | 2 | 5,6 |

Optionally, when the power saving scheme includes a fourteenth power saving scheme for configuring slot format indication SFI, the power saving information includes an index of the SFI.

Wherein the SFI includes an indication of the information transmission direction for U time units, which may include at least one of the following, uplink transmission, downlink transmission, or a flexible transmission direction.

When an information field for indicating SFI configuration is configured as 0 bit, it indicates that no SFI information is configured.

When the information field for indicating the SFI configuration is configured as U bits, and U is greater than or equal to 1 bit, the SFI information may be triggered, the SFI information may include index of SFI having the maximum number of $2^U$ or $2^U-1$. The SFI index may be predetermined, may be configured by higher layer signaling, including RRC signaling, and/or MAC-CE.

For example U=2 bits, the information indicated by the 3-bit information field is shown in Table 34.

TABLE 34 bit field information indicates SFI index

| SFI index indication | SFI index |
|---|---|
| 00 | 0 |
| 01 | 1 |
| 10 | 2 |
| 11 | 3 |

When the power saving scheme includes a fifteenth power saving scheme to configure a time domain adaptive power adjustment, the power saving information includes at least one of information indicating cross-slot scheduling, information indicating current slot scheduling, information indicating multi-slot scheduling, or indication information indicating a mapping relation between at least two of cross-slot scheduling, current slot scheduling, and multi-slot scheduling.

Here, the cross-slot scheduling indication may identify: a time interval (i.e., K0) between transmission/reception of the DCI and transmission/reception of the PDSCH, a time interval (i.e., K2) between transmission/reception of the DCI and transmission/reception of the PUSCH, a time offset of a non-periodic CSI transmission or reception relative to the PDCCH, a time interval between transmission/reception of a non-periodic Sounding Reference Signal (SRS) relative to transmission/reception of DCI, and optionally a time interval (i.e., K1) from PUSCH transmission/reception to ACK feedback. Here, the specific indication method may indicate K0, K1, K2 with a partial bit among the total bits, a time offset of transmission or reception of a non-periodic CSI relative to PDCCH transmission/reception, a time interval between transmission/reception of a non-periodic Sounding Reference Signal (SRS) relative to transmission/reception of DCI; may indicate K0, K1, K2 with the total bits, index indication of the mapping relation between the time offset of transmission or reception of a non-periodic CSI relative to PDCCH transmission/reception and the time interval between transmission/reception of a non-periodic Sounding Reference Signal (SRS) relative to transmission/reception of DCI.

Alternatively, the cross-slot scheduling indication may indicate a numerical relationship of the time interval (i.e., K0) between transmission/reception time of the DCI and transmission/reception of the PDSCH and a first threshold, may be a numerical relationship of the time interval (i.e., K2) between transmission of the DCI and transmission/reception of the PUSCH and a second threshold, may be a numerical relationship of the time interval (i.e., K1) from transmission/reception time of the PUSCH to ACK feedback and a third threshold, may be a numerical relationship between the time offset of transmission or reception of a non-periodic CSI relative to PDCCH transmission/reception and a fourth threshold, may be a numerical relationship between the time interval between transmission/reception of a non-periodic Sounding Reference Signal (SRS) relative to transmission/reception of DCI and a tenth threshold; or indication information of mapping relation of at least two above numerical relationship.

The numerical relationship may be at least one of greater than, equal to, less than or equal to.

The first threshold may be a positive integer greater than zero; the second threshold may be a positive integer greater than zero; the third threshold may be a positive integer greater than zero; the fourth threshold may be a positive integer greater than zero; the tenth threshold may be a positive integer greater than zero; one of the first threshold, the second threshold, the third threshold, the fourth threshold, may be equal to or not equal to any of the other four thresholds.

Alternatively, the cross-slot scheduling indication may be an identifier for indicating whether to perform cross-slot scheduling, and in particular may be an AA bits indication. For example, AA=1 bit, '0' indicates that cross-slot scheduling is implemented and '1' indicates that cross-slot scheduling is not implemented. Where AA=2 bits, '00' indicates that cross-slot scheduling is not implemented; '01' indicates that cross-slot scheduling is implemented and the quantity of slots to be crossed is equal to 1; '10' indicates that cross-slot scheduling is implemented and the quantity of slots to be crossed is equal to 2; '11' indicates that cross-slot scheduling is implemented and the quantity of slots to be crossed is equal to 3; other values of AA are not detailed herein.

The particular mode of the slot scheduling indication may identify at least one of a start time for data transmission, an end time, or a duration of data transmission, or a time offset between the start time for data transmission and the time at which the scheduling indication information is located, or an indication information of a mapping relation between the above at least two items of data.

Alternatively, the current slot scheduling indication may be an indication of a numerical relationship between a time interval of transmission/reception of the DCI and transmission/reception of the PDSCH and a fifth threshold, a numerical relationship between a time interval of transmission/reception of the DCI and transmission/reception of PUSCH and a sixth threshold, or indication information of a mapping relation of the above at least two numerical relationships. The interval may be a symbol including the case where either the DCI or the PDSCH is transmitted within one symbol.

The numerical relationship may be at least one of greater than, equal to, less than or equal to.

The fifth threshold may be a positive integer greater than zero; the sixth threshold may be a positive integer greater than zero; and the fifth threshold value, the sixth threshold value, may or may not be equal.

Alternatively, the current slot scheduling indication may be an indication of whether the current slot scheduling is performed, and whether the UE may reduce the processing time, or whether the UE may switch off a part of devices, specifically, the AB bits is used for indication. For example, AB=1 bit, '0' indicates the current slot scheduling is performed and the terminal performs normal data reception, i.e., the terminal may not reduce the processing time, or the terminal may not switch off a part of devices; '1' indicates the current slot scheduling is performed and the terminal may reduce the processing time, or the UE may switch off a part of devices. When AA=2 bits, '00' indicates the current slot scheduling is performed and the terminal performs normal data reception, i.e., the terminal may not reduce the processing time, or the terminal may not switch off a part of devices; '01' indicates the current slot scheduling is performed and the terminal may reduce the processing time, or the UE may switch off a part of devices, the time interval is the seventh value; '10' indicates the current slot scheduling is performed and the terminal may reduce the processing time, or the UE may switch off a part of devices, the time interval is the eighth value; '11' indicates the current slot scheduling is performed and the terminal may reduce the processing time, or the UE may switch off a part of devices, the time interval is the ninth value; other values of AA are not further described herein.

The multi-slot scheduling indication may identify at least one of the following information: a quantity of multi-slots, a start position in a time domain of the multi-slot, and an end position in time domain of the multi-slot; and the total bit may be used to indicate an index indication of an association of the above information.

When the power saving scheme includes a sixteenth power saving scheme for configuring spatial-domain adaptive power adjustment, the power saving information includes at least one of a quantity of antennas, a quantity of spatial layers, a quantity of codebooks, binding relationships between the antennas, or indication information for indicating mapping relation between at least two of the quantity of antennas, the quantity of spatial layers, the quantity of codebooks, and the binding relationships between the antennas.

It is noted that when at least two power saving schemes are carried in the same DCI, different information fields (i.e. several bits) can be used to represent the specific power saving information of different power saving schemes, respectively, or one information field can be used to represent the mapping relation between the power saving schemes. The latter can use only one information field to indicate the power saving information of multiple power saving schemes simultaneously.

Similarly, for different parameters in the power saving information of one power saving scheme, different parameters can be represented by different information fields (i.e., several bits) or a mapping relation between the parameters can be represented by one information field. Here, the latter can indicate the values of parameters simultaneously by using only one information field.

For example, when the ninth power saving scheme for configuring PDCCH AL, the tenth power saving scheme for configuring PDCCH CORESET, and the eleventh power saving scheme for configuring PDCCH SS, are carried in the same DCI, it can be represented in Table 35.

TABLE 35 bit field information indicates mapping relation of PDCCH AL, CORESET, SS

| PDCCH decoding power saving information indication | PDCCH AL indication | PDCCH CORESET number indication (0 to 9) | PDCCH SS number indication (0 to 39) |
|---|---|---|---|
| 0000 | 1 | 1 | 1 |
| 0001 | 1 | 2 | 2 |
| 0010 | 1 | 3 | 3 |
| 0011 | 1 | 4 | 4 |
| 0100 | 2 | 1,2 | 1,2 |
| 0101 | 2 | 3,4 | 3,4 |
| 0110 | 2 | 5,6 | 5,6 |
| 0111 | 4 | 1,2,3 | 1,2,3 |
| 0111 | 4 | 4,5,6 | 4,5,6 |
| 1000 reserved | 4 | 1,2,3 | 1,2,3 |

Wherein the number range of CORESET for each UE is from 0 to 9, the number range of SS for each UE is from 0 to 39, and the range of AL for each UE is from {1, 2, 4, 8, 16}.

Second Embodiment

Figure 2:
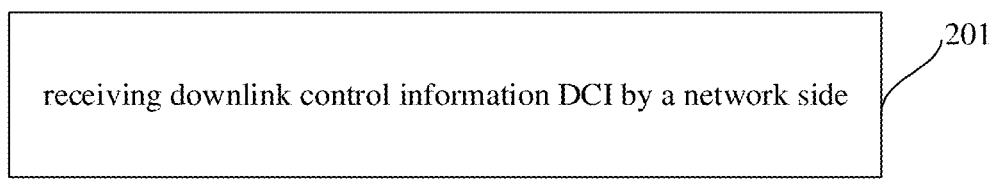
FIG. 2 shows a flow chart of a power saving indication method of a second embodiment of the present disclosure.

Embodiments of the present disclosure also provide a power saving indication method applied to user equipment, as shown in FIG. 2, the method includes the following steps.

Step 201: receiving downlink control information DCI by a network side.

The DCI carries power saving information of at least one UE, the power saving information being used to indicate at least one power saving scheme or a mapping relation between at least two power saving schemes.

The information field in the DCI for identifying power saving information may include E fields, each field represents power saving information of at least one UE, and each field contains 0 to H bits indicating power saving information, E and H are positive integers.

The power saving scheme indicated by the power saving information may be statically configured, or semi-statically configured, or dynamically configured. In particular, it may be predefined, RRC signaling configured, MAC-CE configured, or layer one signaling/channel configured. The layer one signaling/channel may be physical layer signaling/channel, or configured based on downlink control information indication.

The static configuration is preset. The semi-static configuration may be based on RRC signaling, MAC-CE, and the dynamic configuration may be based on layer one signaling/channel configuration.

The power saving information is used to indicate the categories of the power saving scheme, which can be all or part of categories of the power saving schemes configured by the base station.

In the embodiments of the present disclosure, a specific design of DCI for an power saving information indication is achieved by carrying power saving information of at least one UE on DCI and indicating the power saving information for indicating one power saving scheme or a mapping relation between two power saving schemes.

Optionally, the method further includes: performing power saving operation according to the power saving information carried in the DCI.

Optionally, the power saving scheme includes at least one of the following:
- a first power saving scheme of configuring to wake up and monitor physical layer downlink control channel (PDCCH);
- a second power saving scheme of configuring to sleep and not monitor PDCCH; a third power saving scheme of configuring to monitor a first preset quantity of PDCCH time units;
- a fourth power saving scheme of configuring to skip monitoring a second preset quantity of PDCCH time units;
- a fifth power saving scheme of configuring to sleep a secondary serving cell; a sixth power saving scheme of configuring bandwidth part (BWP);
- a seventh power saving scheme of configuring multi-carrier;
- an eighth power saving scheme of configuring discontinuous reception;
- a ninth power saving scheme of configuring PDCCH aggregation levels;
- a tenth power saving scheme of configuring PDCCH control resource sets;
- an eleventh power saving scheme of configuring PDCCH search spaces;
- a twelfth power saving scheme of configuring radio resource management (RRM);
- a thirteenth power saving scheme of configuring channel state information (CSI);
- a fourteenth power saving scheme of configuring a slot format indication (SFI); a fifteenth power saving scheme of configuring time-domain adaptive power adjustment; or
- a sixteenth power saving scheme of configuring spatial-domain adaptive power adjustment.

For example, the UE, according to the received power saving information, determines whether to wake up and monitor PDCCH, whether to sleep and not to monitor PDCCH, whether to monitor F PDCCH time units, whether to skip monitoring G PDCCH time units, whether to switch BWP, whether to activate/deactivate carrier, whether to configure dormancy Scell, whether to configure DRX parameter set, whether to configure PDCCH aggregation level, whether to configure PDCCH control resource set, whether to configure PDCCH search space, whether to configure RRM power saving function, whether to configure CSI, whether to configure SFI, whether to perform adaptive power adjustment, or whether to perform space-domain adaptive power adjustment.

Optionally, the performing a power saving operation in accordance with the power saving information carried in the DCI includes: descrambling the DCI using a predetermined radio network temporary identity, RNTI; performing the power saving operation based on information obtained after descrambling.

When DCI carrying the power saving indication information is scrambled, the new defined Radio Network Temporary Identifier (RNTI) or the existing RNTI may be scrambled. Therefore, the UE performs descrambling with the same RNTI.

Optionally, the DCI includes DCI in one format, or alternatively, DCI in at least two formats, and the power saving information carried in different formats of the DCI is different.

Optionally, when the DCI includes DCI in at least two formats, the descrambling the DCI using a predetermined radio network temporary identifier RNTI, includes: descrambling the DCI in different formats using predetermined different RNTIs.

Optionally, the DCI further includes a DCI format identifier for identifying a type of power saving scheme indicated by the power saving information. Specific explanations of the DCI format identifier are detailed herein with respect to the first embodiment (i.e., the network side device), and will not be described in detail herein.

Optionally, when the power saving scheme includes a first power saving scheme configured to wake up and monitor PDCCH, the power saving information includes information indicating to wake up and monitor PDCCH in a preset time period. The detailed description of the indication information of the first power saving scheme can be found in the first embodiment (i.e. the network side device), and will not be further described herein.

Optionally, when the power saving scheme includes a second power saving scheme configured to sleep and not monitor PDCCH, the power saving information includes information indicating to sleep and not monitor PDCCH in a preset period of time. The detailed description of the indication information of the second power saving scheme can be found in the first embodiment (i.e. the network side device), and will not be further described herein.

Optionally, when the power saving scheme includes a third power saving scheme configured to monitor the first preset quantity of PDCCH time units, the power saving information includes information indicating to monitor the first preset quantity of PDCCH time units within a preset time period; or the power saving information includes at least one of or indication information indicating a mapping relation between at least two of: the first preset quantity, an index of PDCCH time units to be monitored, a start position of a PDCCH time unit to be monitored, a time offset of a PDCCH time unit to be monitored relative to the start position; or the power saving information includes an end position of the PDCCH time unit to be monitored and at least one of, or indication information indicating a mapping relation between the end position of the PDCCH time unit to be monitored and the at least one of: the first preset quantity, an index of PDCCH time units to be monitored, a start position of a PDCCH time unit to be monitored, and a time offset of a PDCCH time unit to be monitored relative to the start position.

Detailed description of the indication information of the third power saving scheme is given in the first embodiment (i.e., network side device), where a detailed description will not be given.

Optionally, when the power saving scheme includes a fourth power saving scheme configured to skip monitoring the second preset quantity of PDCCH time units, the power saving information includes information indicating skipping monitoring the second preset quantity of PDCCH time units during a preset time period; or The power saving information includes at least one of or indication information indicating a mapping relation between at least two of: a second preset quantity, an index of PDCCH time unit to be skipped monitoring, a start position of a PDCCH time unit to be skipped monitoring, a time offset of a PDCCH time unit to be skipped monitoring relative to the start position; or The power saving information includes an end position of a PDCCH time unit to be skipped monitoring and at least one of: or indication information indicating a mapping relation between the end position of the PDCCH time unit to be skipped monitoring and at least one of: a second preset quantity, an index of PDCCH time units to be skipped monitoring, a start position of a PDCCH time unit to be skipped monitoring, and a time offset of a PDCCH time unit to be skipped monitoring relative to the start position.

Detailed description of the indication information of the fourth power saving scheme is given in the first embodiment (i.e., network side device), where a detailed description will not be given.

Optionally, the preset time period includes at least one discontinuous reception cycle, or an activation time period or a part time period of a discontinuous reception, or at least one PDCCH time unit in a discontinuous reception activation time period.

Optionally, when the power saving scheme includes a fifth power saving scheme to configure dormant secondary serving cells, the power saving information includes at least one of a quantity of dormant secondary serving cells or an index of the dormant secondary serving cells, or indication information indicating a mapping relation between the quantity of dormant secondary serving cells and the index of the dormant secondary serving cells.

Optionally, when the power saving scheme includes a sixth power saving scheme configuring the BWP, the power saving information includes at least one of a quantity of BWPs or index of the BWPs, or indication information indicating a mapping relation between the quantity of BWPs and the index of the BWPs.

Optionally, when the power saving scheme includes a seventh power saving scheme configuring the multi-carriers, the power saving information includes at least one of a quantity of carriers or an index of the carriers or indication information indicating a mapping relation between the quantity of carriers and the index of the carriers.

Optionally, when the power saving scheme includes an eighth power saving scheme configured for discontinuous reception, the power saving information includes at least one discontinuous reception configuration parameter or indication information indicating a mapping relation between at least two discontinuous reception configuration parameters.

Optionally, when the power saving scheme includes a ninth power saving scheme configuring a PDCCH aggregation level, the power saving information includes at least one of a quantity of PDCCH aggregation levels or an index of the PDCCH aggregation level, or indication information indicating a mapping relation between the quantity of PDCCH aggregation levels and the index of the PDCCH aggregation level.

Optionally, when the power saving scheme includes a tenth power saving scheme to configure PDCCH control resource set, the power saving information includes at least one of a quantity of PDCCH control resource sets and an index of the PDCCH control resource set or indication information indicating a mapping relation between the quantity of the PDCCH control resource sets and the index of PDCCH control resource set.

Optionally, when the power saving scheme includes an eleventh power saving scheme configuring a PDCCH search space, the power saving information includes at least one of a quantity of PDCCH search spaces or an index of the PDCCH search space, or indication information indicating a mapping relation between the quantity of PDCCH search spaces and the index of the PDCCH search space.

Optionally, when the power saving scheme includes a twelfth power saving scheme configured for radio resource management, the power saving information includes at least one of first radio resource management RRM indication information and second radio resource management RRM indication information, or third RRM indication information indicating a mapping relation between the first radio resource management RRM indication information and the second radio resource management RRM indication information, the first radio resource management RRM indication information is for indicating transmission of a RRM reference signal, the second radio resource management RRM indication information is for indicating RRM measurement within DCI valid range, the DCI valid range includes before receiving a next DCI notification, or a time window of a DCI indication, or a time window of a DCI indication configured by radio resource control RRC.

Optionally, when the power saving scheme includes a thirteenth power saving scheme of configuring channel state information, CSI, the power saving information includes at least one of a quantity of CSI request power saving information and an index of the CSI request power saving information, or indication information indicating a mapping relation between the quantity of CSI request power saving information and the index of the CSI request power saving information, wherein the CSI request power saving information includes at least one of a CSI parameter set, a CSI resource set, a mapping relation between the CSI parameter set and the CSI resource set.

Optionally, when the power saving scheme includes a fourteenth power saving scheme of configuring slot format indication SFI, the power saving information includes an index of the SFI.

When the power saving scheme includes a fifteenth power saving scheme to configure a time domain adaptive power adjustment, the power saving information includes at least one of information indicating cross-slot scheduling, information indicating current slot scheduling, information indicating multi-slot scheduling, or indication information indicating a mapping relation between at least two of cross-slot scheduling, current slot scheduling, and multi-slot scheduling.

When the power saving scheme includes a sixteenth power saving scheme for configuring spatial-domain adaptive power adjustment, the power saving information includes at least one of a quantity of antennas, a quantity of spatial layers, a quantity of codebooks, binding relationships between the antennas, or indication information for indicating mapping relation between at least two of the quantity of antennas, the quantity of spatial layers, the quantity of codebooks, and the binding relationships between the antennas.

Detailed explanations of the indication information of the fifth power saving scheme to sixteenth power saving scheme will be described in the first embodiment (i.e., the network side device), and will not be described in detail.

Third Embodiment

In the first embodiment of the present disclosure, the power saving indication method in a network side device is described and the corresponding network side device will be further described with reference to the drawings.

Figure 3:
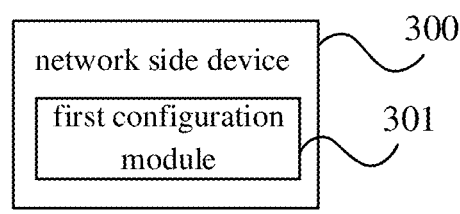
FIG. 3 shows a block schematic diagram of a network side device of a third embodiment of the disclosure.

Specifically, as shown in FIG. 3, the network side device 300 of the embodiments of the present disclosure includes the following functional modules: a first configuration module 310, configured to configure downlink control information DCI, wherein the DCI carries power saving information of at least one UE, the power saving information is used to indicate at least one power saving scheme or a mapping relation between at least two power saving schemes.

Optionally, the type of power saving scheme indicted by the power saving information is predefined, or configured by radio resource control, RRC, signaling, or configured by MAC-CE, or configured by layer one signaling.

Optionally, the network side device 300 further includes: a first scrambling module, configured to scramble the DCI; and a first sending module, configured to send the scrambled DCI to the UE.

Wherein the DCI includes DCI in one format or DCIs in at least two formats, power saving information carried in DCIs in different formats are different.

Optionally, when the DCI includes DCI in at least two formats, the first scrambling module includes: a first scrambling sub-module, configured to scramble DCI in different formats using different radio network temporary identity RNTIs.

Optionally, the DCI further includes a DCI format identifier for identifying a type of power saving scheme indicated by the power saving information.

Optionally, the power saving scheme includes at least one of the following:
a first power saving scheme of configuring to wake up and monitor physical layer downlink control channel (PDCCH);
a second power saving scheme of configuring to sleep and not monitor PDCCH; a third power saving scheme of configuring to monitor a first preset quantity of PDCCH time units;
a fourth power saving scheme of configuring to skip monitoring a second preset quantity of PDCCH time units;
a fifth power saving scheme of configuring to sleep a secondary serving cell; a sixth power saving scheme of configuring bandwidth part (BWP);
a seventh power saving scheme of configuring multi-carrier;
an eighth power saving scheme of configuring discontinuous reception;
a ninth power saving scheme of configuring PDCCH aggregation levels;
a tenth power saving scheme of configuring PDCCH control resource sets;
an eleventh power saving scheme of configuring PDCCH search spaces;
a twelfth power saving scheme of configuring radio resource management (RRM);
a thirteenth power saving scheme of configuring channel state information (CSI);
a fourteenth power saving scheme of configuring a slot format indication (SFI); a fifteenth power saving scheme of configuring time-domain adaptive power adjustment; or
a sixteenth power saving scheme of configuring spatial-domain adaptive power adjustment.

Optionally, when the power saving scheme includes a first power saving scheme configured to wake up and monitor PDCCH, the power saving information includes information indicating to wake up and monitor PDCCH in a preset time period.

Optionally, when the power saving scheme includes a second power saving scheme configured to sleep and not monitor PDCCH, the power saving information includes information indicating to sleep and not monitor PDCCH in a preset period of time.

Optionally, when the power saving scheme includes a third power saving scheme configured to monitor the first preset quantity of PDCCH time units, the power saving information includes information indicating to monitor the first preset quantity of PDCCH time units within a preset time period; or
the power saving information includes at least one of or indication information indicating a mapping relation between at least two of: the first preset quantity, an index of PDCCH time units to be monitored, a start position of a PDCCH time unit to be monitored, a time offset of a PDCCH time unit to be monitored relative to the start position; or
the power saving information includes an end position of the PDCCH time unit to be monitored and at least one of, or indication information indicating a mapping relation between the end position of the PDCCH time unit to be monitored and the at least one of: the first preset quantity, an index of PDCCH time units to be monitored, a start position of a PDCCH time unit to be monitored, and a time offset of a PDCCH time unit to be monitored relative to the start position.

Optionally, when the power saving scheme includes a fourth power saving scheme configured to skip monitoring the second preset quantity of PDCCH time units, the power saving information includes information indicating skipping monitoring the second preset quantity of PDCCH time units during a preset time period; or The power saving information includes at least one of or indication information indicating a mapping relation between at least two of: a second preset quantity, an index of PDCCH time unit to be skipped monitoring, a start position of a PDCCH time unit to be skipped monitoring, a time offset of a PDCCH time unit to be skipped monitoring relative to the start position; or The power saving information includes an end position of a PDCCH time unit to be skipped monitoring and at least one of: or indication information indicating a mapping relation between the end position of the PDCCH time unit to be skipped monitoring and at least one of: a second preset quantity, an index of PDCCH time units to be skipped monitoring, a start position of a PDCCH time unit to be skipped monitoring, and a time offset of a PDCCH time unit to be skipped monitoring relative to the start position.

Optionally, the preset time period includes at least one discontinuous reception cycle, or an activation time period or a part time period of a discontinuous reception, or at least one PDCCH time unit in a discontinuous reception activation time period.

Optionally, when the power saving scheme includes a fifth power saving scheme to configure dormant secondary serving cells, the power saving information includes at least one of a quantity of dormant secondary serving cells or an index of the dormant secondary serving cells, or indication information indicating a mapping relation between the quantity of dormant secondary serving cells and the index of the dormant secondary serving cells.

Optionally, when the power saving scheme includes a sixth power saving scheme configuring the BWP, the power saving information includes at least one of a quantity of BWPs or index of the BWPs, or indication information indicating a mapping relation between the quantity of BWPs and the index of the BWPs.

Optionally, when the power saving scheme includes a seventh power saving scheme configuring the multi-carriers, the power saving information includes at least one of a quantity of carriers or an index of the carriers or indication information indicating a mapping relation between the quantity of carriers and the index of the carriers.

Optionally, when the power saving scheme includes an eighth power saving scheme configured for discontinuous reception, the power saving information includes at least one discontinuous reception configuration parameter or indication information indicating a mapping relation between at least two discontinuous reception configuration parameters.

Optionally, when the power saving scheme includes a ninth power saving scheme configuring a PDCCH aggregation level, the power saving information includes at least one of a quantity of PDCCH aggregation levels or an index of the PDCCH aggregation level, or indication information indicating a mapping relation between the quantity of PDCCH aggregation levels and the index of the PDCCH aggregation level.

Optionally, when the power saving scheme includes a tenth power saving scheme to configure PDCCH control resource set, the power saving information includes at least one of a quantity of PDCCH control resource sets and an index of the PDCCH control resource set or indication information indicating a mapping relation between the quantity of the PDCCH control resource sets and the index of PDCCH control resource set.

Optionally, when the power saving scheme includes an eleventh power saving scheme configuring a PDCCH search space, the power saving information includes at least one of a quantity of PDCCH search spaces or an index of the PDCCH search space, or indication information indicating a mapping relation between the quantity of PDCCH search spaces and the index of the PDCCH search space.

Optionally, when the power saving scheme includes a twelfth power saving scheme configured for radio resource management, the power saving information includes at least one of first radio resource management RRM indication information and second radio resource management RRM indication information, or third RRM indication information indicating a mapping relation between the first radio resource management RRM indication information and the second radio resource management RRM indication information, the first radio resource management RRM indication information is for indicating transmission of a RRM reference signal, the second radio resource management RRM indication information is for indicating RRM measurement within DCI valid range, the DCI valid range includes before receiving a next DCI notification, or a time window of a DCI indication, or a time window of a DCI indication configured by radio resource control RRC.

Optionally, when the power saving scheme includes a thirteenth power saving scheme of configuring channel state information, CSI, the power saving information includes at least one of a quantity of CSI request power saving information and an index of the CSI request power saving information, or indication information indicating a mapping relation between the quantity of CSI request power saving information and the index of the CSI request power saving information, wherein the CSI request power saving information includes at least one of a CSI parameter set, a CSI resource set, a mapping relation between the CSI parameter set and the CSI resource set.

Optionally, when the power saving scheme includes a fourteenth power saving scheme for configuring slot format indication SFI, the power saving information includes an index of the SFI.

When the power saving scheme includes a fifteenth power saving scheme to configure a time domain adaptive power adjustment, the power saving information includes at least one of information indicating cross-slot scheduling, information indicating current slot scheduling, information indicating multi-slot scheduling, or indication information indicating a mapping relation between at least two of cross-slot scheduling, current slot scheduling, and multi-slot scheduling.

When the power saving scheme includes a sixteenth power saving scheme for configuring spatial-domain adaptive power adjustment, the power saving information includes at least one of a quantity of antennas, a quantity of spatial layers, a quantity of codebooks, binding relationships between the antennas, or indication information for indicating mapping relation between at least two of the quantity of antennas, the quantity of spatial layers, the quantity of codebooks, and the binding relationships between the antennas.

The network side device in the embodiments of the present disclosure correspond to the method embodiments described above, and all the implementation in the method embodiments described above are applicable to the network side device embodiments, with the same technical effects.

Fourth Embodiment

In the third embodiment, the power saving indication method in the UE side is described, the UE will now be described with reference to the accompanying drawings.

Figure 4:
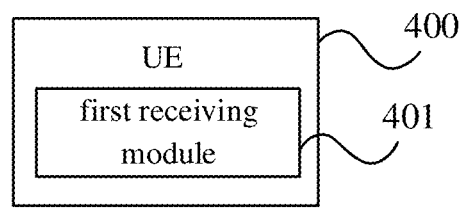
FIG. 4 shows a block schematic diagram of a user equipment (UE) of a fourth embodiment of the disclosure.

Specifically, as shown in FIG. 4, the UE 400 of embodiments of the present disclosure includes the following functional modules: a first receiving module 410, configured to receive downlink control information DCI sent by a network side, wherein the DCI carries power saving information of at least one UE, the power saving information being used to indicate at least one power saving scheme or a mapping relation between at least two power saving schemes.

Optionally, the type of power saving scheme indicated by the power saving information is predefined, or configured by RRC signaling, or MAC-CE, or layer one signaling.

Optionally, the UE 400 further includes: a first power saving module, configured to perform power saving operations in accordance with the power saving information carried in the DCI.

Wherein the first power saving module includes: a first descrambling sub-module, configured to descramble DCI with a predetermined radio network temporary identity, RNTI; and a first power saving sub-module, configured to perform power saving operations in accordance with the information obtained after descrambling.

Optionally, the DCI includes DCI in one format, or at least two formats, the power saving information carried in DCI in different formats are different.

Optionally, when the DCI includes DCI in at least two formats, the first descrambling sub-module includes: a descrambling unit, configured to descramble DCI in different formats with predetermined different RNTI, respectively.

Optionally, the DCI further includes a DCI format identifier for identifying a type of power saving scheme indicated by the power saving information.

Optionally, the power saving scheme includes at least one of the following:
  a first power saving scheme of configuring to wake up and monitor physical layer downlink control channel (PDCCH);
  a second power saving scheme of configuring to sleep and not monitor PDCCH; a third power saving scheme of configuring to monitor a first preset quantity of PDCCH time units;
  a fourth power saving scheme of configuring to skip monitoring a second preset quantity of PDCCH time units;
  a fifth power saving scheme of configuring to sleep a secondary serving cell; a sixth power saving scheme of configuring bandwidth part (BWP);
  a seventh power saving scheme of configuring multi-carrier;
  an eighth power saving scheme of configuring discontinuous reception;
  a ninth power saving scheme of configuring PDCCH aggregation levels;
  a tenth power saving scheme of configuring PDCCH control resource sets;
  an eleventh power saving scheme of configuring PDCCH search spaces;
  a twelfth power saving scheme of configuring radio resource management (RRM);
  a thirteenth power saving scheme of configuring channel state information (CSI);
  a fourteenth power saving scheme of configuring a slot format indication (SFI); a fifteenth power saving scheme of configuring time-domain adaptive power adjustment; or
  a sixteenth power saving scheme of configuring spatial-domain adaptive power adjustment.

Optionally, when the power saving scheme includes a first power saving scheme configured to wake up and monitor PDCCH, the power saving information includes information indicating to wake up and monitor PDCCH in a preset time period.

Optionally, when the power saving scheme includes a second power saving scheme configured to sleep and not monitor PDCCH, the power saving information includes information indicating to sleep and not monitor PDCCH in a preset period of time.

Optionally, when the power saving scheme includes a third power saving scheme configured to monitor the first preset quantity of PDCCH time units, the power saving information includes information indicating to monitor the first preset quantity of PDCCH time units within a preset time period; or
  the power saving information includes at least one of or indication information indicating a mapping relation between at least two of: the first preset quantity, an index of PDCCH time units to be monitored, a start position of a PDCCH time unit to be monitored, a time offset of a PDCCH time unit to be monitored relative to the start position; or
  the power saving information includes an end position of the PDCCH time unit to be monitored and at least one of, or indication information indicating a mapping relation between the end position of the PDCCH time unit to be monitored and the at least one of: the first preset quantity, an index of PDCCH time units to be monitored, a start position of a PDCCH time unit to be monitored, and a time offset of a PDCCH time unit to be monitored relative to the start position.

Optionally, when the power saving scheme includes a fourth power saving scheme configured to skip monitoring the second preset quantity of PDCCH time units, the power saving information includes information indicating skipping monitoring the second preset quantity of PDCCH time units during a preset time period; or
  The power saving information includes at least one of or indication information indicating a mapping relation between at least two of: a second preset quantity, an index of PDCCH time unit to be skipped monitoring, a start position of a PDCCH time unit to be skipped monitoring, a time offset of a PDCCH time unit to be skipped monitoring relative to the start position; or
  The power saving information includes an end position of a PDCCH time unit to be skipped monitoring and at least one of: or indication information indicating a mapping relation between the end position of the PDCCH time unit to be skipped monitoring and at least one of: a second preset quantity, an index of PDCCH time units to be skipped monitoring, a start position of a PDCCH time unit to be skipped monitoring, and a time offset of a PDCCH time unit to be skipped monitoring relative to the start position.

Optionally, the preset time period includes at least one discontinuous reception cycle, or an activation time period or a part time period of a discontinuous reception, or at least one PDCCH time unit in a discontinuous reception activation time period.

Optionally, when the power saving scheme includes a fifth power saving scheme to configure dormant secondary serving cells, the power saving information includes at least one of a quantity of dormant secondary serving cells or an index of the dormant secondary serving cells, or indication information indicating a mapping relation between the quantity of dormant secondary serving cells and the index of the dormant secondary serving cells.

Optionally, when the power saving scheme includes a sixth power saving scheme configuring the BWP, the power saving information includes at least one of a quantity of BWPs or index of the BWPs, or indication information indicating a mapping relation between the quantity of BWPs and the index of the BWPs.

Optionally, when the power saving scheme includes a seventh power saving scheme configuring the multi-carriers, the power saving information includes at least one of a quantity of carriers or an index of the carriers or indication information indicating a mapping relation between the quantity of carriers and the index of the carriers.

Optionally, when the power saving scheme includes an eighth power saving scheme configured for discontinuous reception, the power saving information includes at least one discontinuous reception configuration parameter or indication information indicating a mapping relation between at least two discontinuous reception configuration parameters.

Optionally, when the power saving scheme includes a ninth power saving scheme configuring a PDCCH aggregation level, the power saving information includes at least one of a quantity of PDCCH aggregation levels or an index of the PDCCH aggregation level, or indication information indicating a mapping relation between the quantity of PDCCH aggregation levels and the index of the PDCCH aggregation level.

Optionally, when the power saving scheme includes a tenth power saving scheme to configure PDCCH control resource set, the power saving information includes at least one of a quantity of PDCCH control resource sets and an index of the PDCCH control resource set or indication information indicating a mapping relation between the quantity of the PDCCH control resource sets and the index of PDCCH control resource set.

Optionally, when the power saving scheme includes an eleventh power saving scheme configuring a PDCCH search space, the power saving information includes at least one of a quantity of PDCCH search spaces or an index of the PDCCH search space, or indication information indicating a mapping relation between the quantity of PDCCH search spaces and the index of the PDCCH search space.

Optionally, when the power saving scheme includes a twelfth power saving scheme configured for radio resource management, the power saving information includes at least one of first radio resource management RRM indication information and second radio resource management RRM indication information, or third RRM indication information indicating a mapping relation between the first radio resource management RRM indication information and the second radio resource management RRM indication information, the first radio resource management RRM indication information is for indicating transmission of a RRM reference signal, the second radio resource management RRM indication information is for indicating RRM measurement within DCI valid range, the DCI valid range includes before receiving a next DCI notification, or a time window of a DCI indication, or a time window of a DCI indication configured by radio resource control RRC.

Optionally, when the power saving scheme includes a thirteenth power saving scheme of configuring channel state information, CSI, the power saving information includes at least one of a quantity of CSI request power saving information and an index of the CSI request power saving information, or indication information indicating a mapping relation between the quantity of CSI request power saving information and the index of the CSI request power saving information, wherein the CSI request power saving information includes at least one of a CSI parameter set, a CSI resource set, a mapping relation between the CSI parameter set and the CSI resource set.

Optionally, when the power saving scheme includes a fourteenth power saving scheme for configuring slot format indication SFI, the power saving information includes an index of the SFI.

When the power saving scheme includes a fifteenth power saving scheme to configure a time domain adaptive power adjustment, the power saving information includes at least one of information indicating cross-slot scheduling, information indicating current slot scheduling, information indicating multi-slot scheduling, or indication information indicating a mapping relation between at least two of cross-slot scheduling, current slot scheduling, and multi-slot scheduling.

When the power saving scheme includes a sixteenth power saving scheme for configuring spatial-domain adaptive power adjustment, the power saving information includes at least one of a quantity of antennas, a quantity of spatial layers, a quantity of codebooks, binding relationships between the antennas, or indication information for indicating mapping relation between at least two of the quantity of antennas, the quantity of spatial layers, the quantity of codebooks, and the binding relationships between the antennas.

The user equipment of the present disclosure correspond to the method embodiments described above, and all the implementations in the method embodiments described above are applicable to the UE embodiments with the same technical effects.

Fifth Embodiment

Figure 5:
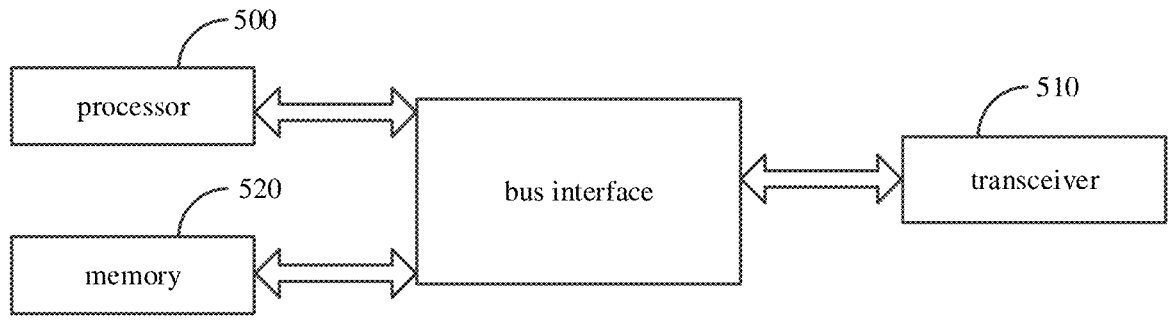
FIG. 5 shows a structural block diagram showing a network side device of a fifth embodiment of the present disclosure.

In order to achieve the above objects in a better way, as shown in FIG. 5, the fifth embodiment of the present disclosure also provides a network side device including: a processor 500; a memory 520 connected to the processor 500 through a bus interface, and a transceiver 510 connected to the processor 500 through the bus interface; the memory 520 is used to store programs and data used by the processor in performing operations; data information or pilots are transmitted through the transceiver 510, and an uplink control channel is received through the transceiver 510; and when the processor 500 calls and executes the programs and data stored in the memory 520, the following functions are implemented.

The computer program is executed by the processor 500 to perform the step of configuring downlink control information DCI, wherein the DCI carries power saving information of at least one UE, the power saving information is used to indicate at least one power saving scheme or a mapping relation between at least two power saving schemes.

Optionally, the type of power saving scheme indicted by the power saving information is predefined, or configured by radio resource control, RRC, signaling, or configured by MAC-CE, or configured by layer one signaling.

The processor 500 executes the computer program to perform the following steps: scrambling DCI; sending the scrambled DCI to the UE.

Wherein the DCI includes DCI in one format or DCIs in at least two formats, power saving information carried in DCIs in different formats are different.

Optionally, when the DCI includes DCI in at least two formats, the first scrambling module includes: a first scrambling sub-module, configured to scramble DCI in different formats using different radio network temporary identity RNTIs.

Optionally, the DCI further includes a DCI format identifier for identifying a type of power saving scheme indicated by the power saving information.

Optionally, the power saving scheme includes at least one of the following:
- a first power saving scheme of configuring to wake up and monitor physical layer downlink control channel (PDCCH);
- a second power saving scheme of configuring to sleep and not monitor PDCCH; a third power saving scheme of configuring to monitor a first preset quantity of PDCCH time units;
- a fourth power saving scheme of configuring to skip monitoring a second preset quantity of PDCCH time units;
- a fifth power saving scheme of configuring to sleep a secondary serving cell; a sixth power saving scheme of configuring bandwidth part (BWP);
- a seventh power saving scheme of configuring multi-carrier;
- an eighth power saving scheme of configuring discontinuous reception;
- a ninth power saving scheme of configuring PDCCH aggregation levels;
- a tenth power saving scheme of configuring PDCCH control resource sets;
- an eleventh power saving scheme of configuring PDCCH search spaces;
- a twelfth power saving scheme of configuring radio resource management (RRM);
- a thirteenth power saving scheme of configuring channel state information (CSI);
- a fourteenth power saving scheme of configuring a slot format indication (SFI); a fifteenth power saving scheme of configuring time-domain adaptive power adjustment; or
- a sixteenth power saving scheme of configuring spatial-domain adaptive power adjustment.

Optionally, when the power saving scheme includes a first power saving scheme configured to wake up and monitor PDCCH, the power saving information includes information indicating to wake up and monitor PDCCH in a preset time period.

Optionally, when the power saving scheme includes a second power saving scheme configured to sleep and not monitor PDCCH, the power saving information includes information indicating to sleep and not monitor PDCCH in a preset period of time.

Optionally, when the power saving scheme includes a third power saving scheme configured to monitor the first preset quantity of PDCCH time units, the power saving information includes information indicating to monitor the first preset quantity of PDCCH time units within a preset time period; or
the power saving information includes at least one of or indication information indicating a mapping relation between at least two of: the first preset quantity, an index of PDCCH time units to be monitored, a start position of a PDCCH time unit to be monitored, a time offset of a PDCCH time unit to be monitored relative to the start position; or
the power saving information includes an end position of the PDCCH time unit to be monitored and at least one of, or indication information indicating a mapping relation between the end position of the PDCCH time unit to be monitored and the at least one of: the first preset quantity, an index of PDCCH time units to be monitored, a start position of a PDCCH time unit to be monitored, and a time offset of a PDCCH time unit to be monitored relative to the start position.

Optionally, when the power saving scheme includes a fourth power saving scheme configured to skip monitoring the second preset quantity of PDCCH time units, the power saving information includes information indicating skipping monitoring the second preset quantity of PDCCH time units during a preset time period; or
The power saving information includes at least one of or indication information indicating a mapping relation between at least two of: a second preset quantity, an index of PDCCH time unit to be skipped monitoring, a start position of a PDCCH time unit to be skipped monitoring, a time offset of a PDCCH time unit to be skipped monitoring relative to the start position; or
The power saving information includes an end position of a PDCCH time unit to be skipped monitoring and at least one of: or indication information indicating a mapping relation between the end position of the PDCCH time unit to be skipped monitoring and at least one of: a second preset quantity, an index of PDCCH time units to be skipped monitoring, a start position of a PDCCH time unit to be skipped monitoring, and a time offset of a PDCCH time unit to be skipped monitoring relative to the start position.

Optionally, the preset time period includes at least one discontinuous reception cycle, or an activation time period or a part time period of a discontinuous reception, or at least one PDCCH time unit in a discontinuous reception activation time period.

Optionally, when the power saving scheme includes a fifth power saving scheme to configure dormant secondary serving cells, the power saving information includes at least one of a quantity of dormant secondary serving cells or an index of the dormant secondary serving cells, or indication information indicating a mapping relation between the quantity of dormant secondary serving cells and the index of the dormant secondary serving cells.

Optionally, when the power saving scheme includes a sixth power saving scheme configuring the BWP, the power saving information includes at least one of a quantity of BWPs or index of the BWPs, or indication information indicating a mapping relation between the quantity of BWPs and the index of the BWPs.

Optionally, when the power saving scheme includes a seventh power saving scheme configuring the multi-carriers, the power saving information includes at least one of a quantity of carriers or an index of the carriers or indication information indicating a mapping relation between the quantity of carriers and the index of the carriers.

Optionally, when the power saving scheme includes an eighth power saving scheme configured for discontinuous reception, the power saving information includes at least one discontinuous reception configuration parameter or indication information indicating a mapping relation between at least two discontinuous reception configuration parameters.

Optionally, when the power saving scheme includes a ninth power saving scheme configuring a PDCCH aggregation level, the power saving information includes at least one of a quantity of PDCCH aggregation levels or an index of the PDCCH aggregation level, or indication information indicating a mapping relation between the quantity of PDCCH aggregation levels and the index of the PDCCH aggregation level.

Optionally, when the power saving scheme includes a tenth power saving scheme to configure PDCCH control resource set, the power saving information includes at least one of a quantity of PDCCH control resource sets and an index of the PDCCH control resource set or indication information indicating a mapping relation between the quantity of the PDCCH control resource sets and the index of PDCCH control resource set.

Optionally, when the power saving scheme includes an eleventh power saving scheme configuring a PDCCH search space, the power saving information includes at least one of a quantity of PDCCH search spaces or an index of the PDCCH search space, or indication information indicating a mapping relation between the quantity of PDCCH search spaces and the index of the PDCCH search space.

Optionally, when the power saving scheme includes a twelfth power saving scheme configured for radio resource management, the power saving information includes at least one of first radio resource management RRM indication information and second radio resource management RRM indication information, or third RRM indication information indicating a mapping relation between the first radio resource management RRM indication information and the second radio resource management RRM indication information, the first radio resource management RRM indication information is for indicating transmission of a RRM reference signal, the second radio resource management RRM indication information is for indicating RRM measurement within DCI valid range, the DCI valid range includes before receiving a next DCI notification, or a time window of a DCI indication, or a time window of a DCI indication configured by radio resource control RRC.

Optionally, when the power saving scheme includes a thirteenth power saving scheme of configuring channel state information, CSI, the power saving information includes at least one of a quantity of CSI request power saving information and an index of the CSI request power saving information, or indication information indicating a mapping relation between the quantity of CSI request power saving information and the index of the CSI request power saving information, wherein the CSI request power saving information includes at least one of a CSI parameter set, a CSI resource set, a mapping relation between the CSI parameter set and the CSI resource set.

Optionally, when the power saving scheme includes a fourteenth power saving scheme for configuring slot format indication SFI, the power saving information includes an index of the SFI.

When the power saving scheme includes a fifteenth power saving scheme to configure a time domain adaptive power adjustment, the power saving information includes at least one of information indicating cross-slot scheduling, information indicating current slot scheduling, information indicating multi-slot scheduling, or indication information indicating a mapping relation between at least two of cross-slot scheduling, current slot scheduling, and multi-slot scheduling.

When the power saving scheme includes a sixteenth power saving scheme for configuring spatial-domain adaptive power adjustment, the power saving information includes at least one of a quantity of antennas, a quantity of spatial layers, a quantity of codebooks, binding relationships between the antennas, or indication information for indicating mapping relation between at least two of the quantity of antennas, the quantity of spatial layers, the quantity of codebooks, and the binding relationships between the antennas.

In FIG. 5, the bus architecture may include any quantity of interconnecting buses and bridges, in particular various circuits of one or more processors represented by the processor 500, and memory represented by the memory 520 are linked together. The bus architecture may also link various other circuits such as peripherals, voltage regulators, power management circuits, and the like, which are well known in the art, and therefore, which will not be described any further herein. The bus interface provides the interface. The transceiver 510 may be a plurality of elements including transmitters and transceivers, provides the units for communicating with various other devices over a transmission medium. The processor 500 is responsible for managing the bus architecture and the general processing, and the memory 520 may store data used by the processor 500 in performing the operations.

Figure 6:
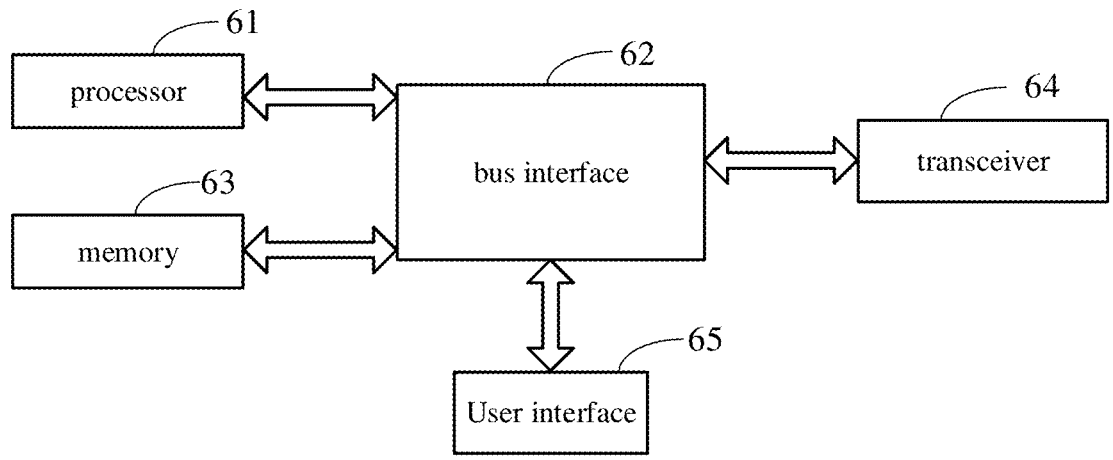
FIG. 6 shows a structural block diagram of a UE of a sixth embodiment of the present disclosure.

It will be appreciated by those skilled in the art that some or all of the steps for implementing the above-described embodiments may be performed by hardware, or by hardware indicated by a computer program, the computer program include all or part instructions for performing the above described methods, and the computer program may be stored on a readable storage medium, the storage medium may be any form of storage medium Sixth Embodiment The present embodiment provides a terminal, as shown in FIG. 6, includes: a processor 61; and a memory 63 connected to the processor 61 through bus interface 62, the memory is used to store programs and data used by the processor 61 in performing operations, and the programs and data are called and executed by processor 61 to perform the following processes.

Here, a transceiver 64 is connected to the bus interface 62 for receiving and sending data under the control of the processor 61.

The processor 61 executes the computer program to perform the following steps: receiving a downlink control information DCI send by a network side, wherein the DCI carries power saving information of at least one UE, the power saving information is used to indicate at least one power saving scheme or a mapping relation between at least two power saving schemes.

Optionally, the type of power saving scheme indicted by the power saving information is predefined, or configured by radio resource control, RRC, signaling, or configured by MAC-CE, or configured by layer one signaling.

The processor 61 executes the computer program to perform the power saving operations in accordance with the power saving information carried in the DCI.

The processor 61 executes the computer program to perform the step of descrambling DCI using the predetermined radio network temporary identifier RNTI.

The processor 61 executes the computer program to perform the step of: performing power saving operations based on the information obtained after descrambling.

Optionally, the DCI includes DCI in one format or DCIs in at least two formats, power saving information carried in DCIs in different formats are different.

Optionally, when the DCI includes DCI in at least two formats, the computer program is executed by the processor 61 to perform the step of descrambling the DCI in different formats with the predetermined different RNTIs respectively.

Optionally, the DCI further includes a DCI format identifier for identifying a type of power saving scheme indicated by the power saving information.

Optionally, the power saving scheme includes at least one of the following:
- a first power saving scheme of configuring to wake up and monitor physical layer downlink control channel (PDCCH);
- a second power saving scheme of configuring to sleep and not monitor PDCCH; a third power saving scheme of configuring to monitor a first preset quantity of PDCCH time units;
- a fourth power saving scheme of configuring to skip monitoring a second preset quantity of PDCCH time units;
- a fifth power saving scheme of configuring to sleep a secondary serving cell; a sixth power saving scheme of configuring bandwidth part (BWP);
- a seventh power saving scheme of configuring multi-carrier;
- an eighth power saving scheme of configuring discontinuous reception;
- a ninth power saving scheme of configuring PDCCH aggregation levels;
- a tenth power saving scheme of configuring PDCCH control resource sets;
- an eleventh power saving scheme of configuring PDCCH search spaces;
- a twelfth power saving scheme of configuring radio resource management (RRM);
- a thirteenth power saving scheme of configuring channel state information (CSI);
- a fourteenth power saving scheme of configuring a slot format indication (SFI); a fifteenth power saving scheme of configuring time-domain adaptive power adjustment; or
- a sixteenth power saving scheme of configuring spatial-domain adaptive power adjustment.

Optionally, when the power saving scheme includes a first power saving scheme configured to wake up and monitor PDCCH, the power saving information includes information indicating to wake up and monitor PDCCH in a preset time period.

Optionally, when the power saving scheme includes a second power saving scheme configured to sleep and not monitor PDCCH, the power saving information includes information indicating to sleep and not monitor PDCCH in a preset period of time.

Optionally, when the power saving scheme includes a third power saving scheme configured to monitor the first preset quantity of PDCCH time units, the power saving information includes information indicating to monitor the first preset quantity of PDCCH time units within a preset time period; or the power saving information includes at least one of or indication information indicating a mapping relation between at least two of: the first preset quantity, an index of PDCCH time units to be monitored, a start position of a PDCCH time unit to be monitored, a time offset of a PDCCH time unit to be monitored relative to the start position; or the power saving information includes an end position of the PDCCH time unit to be monitored and at least one of, or indication information indicating a mapping relation between the end position of the PDCCH time unit to be monitored and the at least one of: the first preset quantity, an index of PDCCH time units to be monitored, a start position of a PDCCH time unit to be monitored, and a time offset of a PDCCH time unit to be monitored relative to the start position.

Optionally, when the power saving scheme includes a fourth power saving scheme configured to skip monitoring the second preset quantity of PDCCH time units, the power saving information includes information indicating skipping monitoring the second preset quantity of PDCCH time units during a preset time period; or The power saving information includes at least one of or indication information indicating a mapping relation between at least two of: a second preset quantity, an index of PDCCH time unit to be skipped monitoring, a start position of a PDCCH time unit to be skipped monitoring, a time offset of a PDCCH time unit to be skipped monitoring relative to the start position; or The power saving information includes an end position of a PDCCH time unit to be skipped monitoring and at least one of: or indication information indicating a mapping relation between the end position of the PDCCH time unit to be skipped monitoring and at least one of: a second preset quantity, an index of PDCCH time units to be skipped monitoring, a start position of a PDCCH time unit to be skipped monitoring, and a time offset of a PDCCH time unit to be skipped monitoring relative to the start position.

Optionally, the preset time period includes at least one discontinuous reception cycle, or an activation time period or a part time period of a discontinuous reception, or at least one PDCCH time unit in a discontinuous reception activation time period.

Optionally, when the power saving scheme includes a fifth power saving scheme to configure dormant secondary serving cells, the power saving information includes at least one of a quantity of dormant secondary serving cells or an index of the dormant secondary serving cells, or indication information indicating a mapping relation between the quantity of dormant secondary serving cells and the index of the dormant secondary serving cells.

Optionally, when the power saving scheme includes a sixth power saving scheme configuring the BWP, the power saving information includes at least one of a quantity of BWPs or index of the BWPs, or indication information indicating a mapping relation between the quantity of BWPs and the index of the BWPs.

Optionally, when the power saving scheme includes a seventh power saving scheme configuring the multi-carriers, the power saving information includes at least one of a quantity of carriers or an index of the carriers or indication information indicating a mapping relation between the quantity of carriers and the index of the carriers.

Optionally, when the power saving scheme includes an eighth power saving scheme configured for discontinuous reception, the power saving information includes at least one discontinuous reception configuration parameter or indication information indicating a mapping relation between at least two discontinuous reception configuration parameters.

Optionally, when the power saving scheme includes a ninth power saving scheme configuring a PDCCH aggregation level, the power saving information includes at least one of a quantity of PDCCH aggregation levels or an index of the PDCCH aggregation level, or indication information indicating a mapping relation between the quantity of PDCCH aggregation levels and the index of the PDCCH aggregation level.

Optionally, when the power saving scheme includes a tenth power saving scheme to configure PDCCH control resource set, the power saving information includes at least one of a quantity of PDCCH control resource sets and an index of the PDCCH control resource set or indication information indicating a mapping relation between the quantity of the PDCCH control resource sets and the index of PDCCH control resource set.

Optionally, when the power saving scheme includes an eleventh power saving scheme configuring a PDCCH search space, the power saving information includes at least one of a quantity of PDCCH search spaces or an index of the PDCCH search space, or indication information indicating a mapping relation between the quantity of PDCCH search spaces and the index of the PDCCH search space.

Optionally, when the power saving scheme includes a twelfth power saving scheme configured for radio resource management, the power saving information includes at least one of first radio resource management RRM indication information and second radio resource management RRM indication information, or third RRM indication information indicating a mapping relation between the first radio resource management RRM indication information and the second radio resource management RRM indication information, the first radio resource management RRM indication information is for indicating transmission of a RRM reference signal, the second radio resource management RRM indication information is for indicating RRM measurement within DCI valid range, the DCI valid range includes before receiving a next DCI notification, or a time window of a DCI indication, or a time window of a DCI indication configured by radio resource control RRC.

Optionally, when the power saving scheme includes a thirteenth power saving scheme of configuring channel state information, CSI, the power saving information includes at least one of a quantity of CSI request power saving information and an index of the CSI request power saving information, or indication information indicating a mapping relation between the quantity of CSI request power saving information and the index of the CSI request power saving information, wherein the CSI request power saving information includes at least one of a CSI parameter set, a CSI resource set, a mapping relation between the CSI parameter set and the CSI resource set.

Optionally, when the power saving scheme includes a fourteenth power saving scheme for configuring slot format indication SFI, the power saving information includes an index of the SFI.

When the power saving scheme includes a fifteenth power saving scheme to configure a time domain adaptive power adjustment, the power saving information includes at least one of information indicating cross-slot scheduling, information indicating current slot scheduling, information indicating multi-slot scheduling, or indication information indicating a mapping relation between at least two of cross-slot scheduling, current slot scheduling, and multi-slot scheduling.

When the power saving scheme includes a sixteenth power saving scheme for configuring spatial-domain adaptive power adjustment, the power saving information includes at least one of a quantity of antennas, a quantity of spatial layers, a quantity of codebooks, binding relationships between the antennas, or indication information for indicating mapping relation between at least two of the quantity of antennas, the quantity of spatial layers, the quantity of codebooks, and the binding relationships between the antennas.

In FIG. 6, the bus architecture can include any quantity of interconnecting buses and bridges, in particular various circuits of one or more processors represented by processor 61 and memory represented by memory 63, linked together. The bus architecture can also link various other circuits such as peripherals, voltage regulators, power management circuits, and the like, which are well known in the art, and therefore, which will not be described further herein. The bus interface provides the interface. The transceiver 64, which can be a plurality of units including a transmitter and a transceiver, provides the units for communicating with various other devices over the transmission medium. The user interface 65 can also be an interface capable of interfacing with desired devices including, but not limited to, keypads, displays, speakers, microphones, joysticks, and the like. The processor 61 is responsible for managing the bus architecture and the general processing, and the memory 63 can store data used by the processor 61 in performing the operations.

It will be appreciated by those skilled in the art that some or all of the steps for implementing the above-described embodiments may be performed by hardware, or by hardware indicated by a computer program, the computer program include all or part instructions for performing the above described methods, and the computer program may be stored on a readable storage medium, the storage medium may be any form of storage medium Seventh Embodiment In the related art, in the UE power saving topic based on NR R16 SI, the power saving method based on BWP dynamic switching can further reduce UE power consumption. Further, if BWP is switched to wider carrier, since the channel state indication information cannot be obtained timely, data scheduling is performed in a near-blind manner within a time period, history information may be used and conservative method is used. The UE can be made to do some inefficiency, error, or not schedule during the time period. This results in waste of power consumption of UE during channel state request to channel state information acquisition, for example, if the UE is not scheduled during the time period because the UE does not acquire channel state indication information so that the priority of the UE to be scheduled is reduced, but the UE still monitors PDCCH during the time period; or the UE performs transmission with conservative channel state information during the time period so that the transmission efficiency of the UE is reduced, thereby increasing the power consumption of the UE; or the UE use erroneous channel state information during the time period so that the transmission of the UE is invalid, or even retransmission is invalid, thereby increasing the power consumption of the UE.

In the case where the UE power saving scheme is adjusted based on the BWP, the UE may configure up to four BWPs, and the base station may configure the UE to monitor the PDCCH on the narrow BWPs, and switch to a corresponding broadband of BWP for data transmission depending on the traffic characteristics, size, transmission rate, etc. of the data packets when there is a need to transmit the data. When the data transmission is completed, the UE then switches to monitor the PDCCH on the narrow BWPs.

On the other hand, in the UE power saving scheme based on BWP adjustment, based on the existing protocol, the base station cannot obtain channel state information of the invalid BWP information because the UE cannot report the channel state information on the invalid BWP. At this time, the base station can trigger the channel state information by DCI to transmit a non-periodic channel state indication reference signal to obtain the channel state information. However, there is a time delay from the channel state information request to the channel state information acquisition, which includes the time offset for the transmission of DCI to the transmission of the non-periodic channel state information reference signal and the time delay for the transmission of the channel state information reference signal to the feedback of the channel state information. In the related art, the time offset for the transmission of the DCI to the transmission of the non-periodic channel state information reference signal, for example, 0 time units to 4 time units are supported, and the time offset for reporting of the channel state information to the DCI PUSCH scheduling, for example, 0 time units to 7 time units are supported, the time unit can be a slot or a symbol.

It is thus known that, in the related art, since the UE is activated from the channel state information request to the channel state information acquisition, during the DRX-on period, the UE continuously monitors the PDCCH, regardless of whether the UE acquires the channel state information at this time and whether UE is scheduled, thereby resulting an additional power consumption.

Embodiments of the present disclosure provide a power saving indication method for solving a problem of additional power consumption caused during a period from a channel state information request to a channel state information acquisition.

In a power saving indication method of an embodiment of the present disclosure, the UE is instructed to skip monitoring PDCCH during period from the channel state information request to the channel state information acquisition, that is, the UE is instructed not to monitor the PDCCH during the channel state request to the channel state acquisition, saves power consumption, and solves the problem of additional power consumption caused during the period from the channel state information request to the channel state information acquisition.

Figure 10:
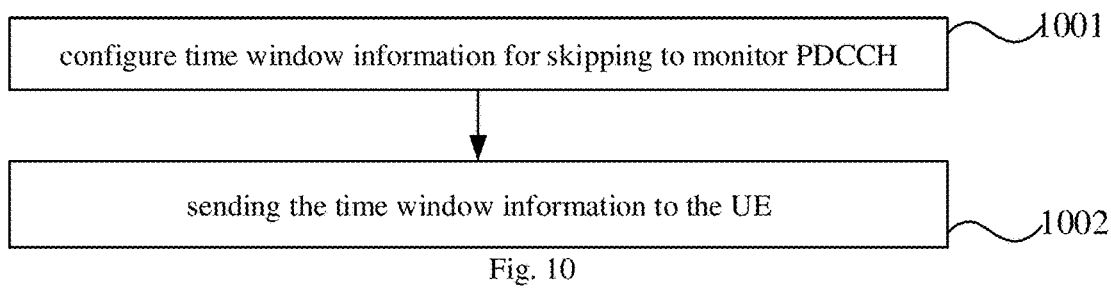
FIG. 10 shows a flow chart of a power saving indication method of a seventh embodiment of the disclosure.

The power saving indication method of the embodiment of the present disclosure is applied to a network side device, as shown in FIG. 10, and the method particularly includes the following steps.

Step 1001: configuring time window information for skipping monitoring PDCCH.

The time window information may be used to instruct the UE to skip monitoring PDCCH in a target time period, the target time period is in a duration from the channel state information request to the channel state information acquisition. Optionally, the skipping monitoring PDCCH may include at least one of: skipping monitoring a search space carrying downlink control information in the PDCCH and skipping monitoring a search space carrying uplink control information in the PDCCH.

The time window information may be predefined, and may be configured by higher layer signaling, e.g. RRC signaling, MAC-CE, and may be configured by physical layer signaling, i.e. the time window information may be statically, semi-statically, and dynamically configured.

Optionally, the target time period is any one of: a time period between a time unit for triggering channel state indication and a time unit for reporting the channel state indication; a time period between a time unit for triggering the channel state indication and a time unit for sending a reference signal of the channel state indication; a time period between the time unit for sending the reference signal of channel state indication and the time unit for feeding back the channel state indication.

Wherein the triggering channel state indication may be at least one of: resource configuration of the reference signal of the channel state indication, channel state reporting information, or indication information of the mapping relation between the resource configuration of the reference signal of the channel state indication and the channel state reporting information.

The reference signal of the channel state indication may include at least one of: a reference signal for channel tracking, a reference signal for beam management, a reference signal for phase adjustment, or a reference signal for RRM measurement.

The channel state reporting information may include at least one of: radio channel state information indication, beam management information indication, or RRM measurement information indication. The RRM measurement may be at least one of Reference Signal Received Power (RSRP), Reference Signal Received Quality (RSRQ), Received Signal Strength Indicator (RSSI), or Signal to Interference plus Noise Ratio (SINR).

The resource configuration of the reference signal of the channel state indication may be resource configuration information in a time domain, a frequency domain, and a spatial domain of the reference signal.

The indication information of a mapping relation between the resource configuration of the reference signal of the channel state indication and channel state reporting information may include a mapping relation between at least one of the resource configuration of the reference signal of and the channel state reporting information. The mapping relation may be a one-to-one mapping, a one-to-many mapping, a many-to-one mapping.

Additionally, the trigger channel state indication may be carried on downlink control information, may be carried on power saving signal/channel, may be carried on PDSCH.

Step 1002: sending the time window information to UE.

Optionally, the sending the time window information to UE includes: carrying the time window information on a higher layer signaling and sending the time window information to the UE; or carrying the time window information on a physical layer signaling and sending the time window information to the UE when the transmission time of the physical layer signaling comes.

As can be seen from the above, when the time window information is carried on higher layer signaling, it may be transmitted after the time window information is configured, when the time window information is carried on the physical layer signaling, and the time window information may be sent when the transmission time of the physical layer signaling comes.

Wherein the physical layer signaling may be configured based on a DCI, the DCI may be used for data scheduling including at least one of: UL data scheduling or DL data scheduling; the DCI may be used for group information sending, e.g. a slot format indication, a transmission interrupt indication, a power control parameter indication.

The physical layer signaling may also be configured based on an power saving signal/channel, which indicates power saving configuration information of the UE, and the power saving information may include at least one of: whether to wake up and monitor the PDCCH, whether to sleep and not monitor the PDCCH, whether to monitor F PDCCH units, whether to skip monitoring G PDCCH units, whether to switch BWPs, whether to activate/deactivate carriers, whether to configure dormancy Scell, whether to configure a DRX parameter set, whether to configure a PDCCH aggregation level, whether to configure PDCCH control resource set, whether to configure a PDCCH search space, whether to configure a RRM power saving function, whether to configure CSI, whether to configure SFI, whether to perform an adaptive power adjustment, or whether to perform spatial-domain adaptive power adjustment.

Here, although the above-described time window information indicates that the UE does not monitor the PDCCH for a preset time period, it does not affect the network side device to transmit the DCI in the preset time period and receive the channel state indication reporting information. Therefore, after the above-described step 1002, the network side device can also perform the following steps:

First step: transmitting DCI; in particular, the base station transmits DCI information at the moment when DCI transmission comes.

Second step: the base station receives channel state indication reporting information. In particular, the base station receives channel state indication reporting information in the configured time domain, frequency domain, and spatial domain.

In addition, the network side device may also perform the following steps:

Step A: sending a trigger channel state indication signal;
Step B: sending a channel state indication reference signal;
Step C: receiving a reported measurement result.

Eighth Embodiment

Figure 11:
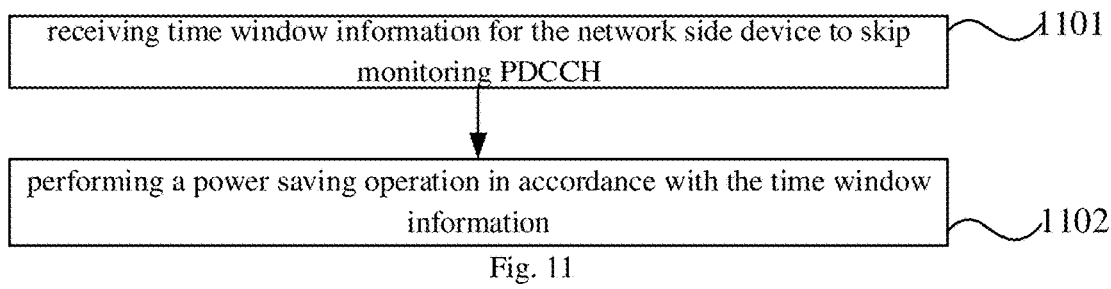
FIG. 11 shows a flow chart of a power saving indication method of an eighth embodiment of the disclosure.

An embodiment of the present disclosure also provides a power saving indication method, applied to a UE, as shown in FIG. 11, the method includes Step 1101: receiving time window information configured by the network side to skip monitoring PDCCH.

The time window information may be used to instruct the UE to skip monitoring PDCCH in a target time period, the target time period is in a duration from the channel state information request to the channel state information acquisition. Optionally, the skipping monitoring PDCCH may include at least one of: skipping monitoring a search space carrying downlink control information in the PDCCH and skipping monitoring a search space carrying uplink control information in the PDCCH.

The time window information may be predefined, and may be configured by higher layer signaling, e.g. RRC signaling, MAC-CE, and may be configured by physical layer signaling, i.e. the time window information may be statically, semi-statically, and dynamically configured.

Optionally, the target time period is any one of: a time period between a time unit for triggering channel state indication and a time unit for reporting the channel state indication; a time period between a time unit for triggering the channel state indication and a time unit for sending a reference signal of the channel state indication; a time period between the time unit for sending the reference signal of channel state indication and the time unit for feeding back the channel state indication.

Wherein the triggering channel state indication may be at least one of: resource configuration of the reference signal of the channel state indication, channel state reporting information, or indication information of the mapping relation between the resource configuration of the reference signal of the channel state indication and the channel state reporting information.

The reference signal of the channel state indication may include at least one of: a reference signal for channel tracking, a reference signal for beam management, a reference signal for phase adjustment, or a reference signal for RRM measurement.

The channel state reporting information may include at least one of: radio channel state information indication, beam management information indication, or RRM measurement information indication. The RRM measurement may be at least one of Reference Signal Received Power (RSRP), Reference Signal Received Quality (RSRQ), Received Signal Strength Indicator (RSSI), or Signal to Interference plus Noise Ratio (SINR).

The resource configuration of the reference signal of the channel state indication may be resource configuration information in a time domain, a frequency domain, and a spatial domain of the reference signal.

The indication information of a mapping relation between the resource configuration of the reference signal of the channel state indication and channel state reporting information may include a mapping relation between at least one of the resource configuration of the reference signal of and the channel state reporting information. The mapping relation may be a one-to-one mapping, a one-to-many mapping, a many-to-one mapping.

Additionally, the trigger channel state indication may be carried on downlink control information, may be carried on power saving signal/channel, may be carried on PDSCH.

Optionally, the receiving the time window information configured by the network side to skip monitoring PDCCH includes: receiving higher layer signaling carrying the time window information sent by the network side device; or receiving the physical layer signaling carrying the time window information sent by the network side device.

As can be seen from the above, when the time window information is carried on higher layer signaling, it may be transmitted after the time window information is configured, when the time window information is carried on the physical layer signaling, and the time window information may be sent when the transmission time of the physical layer signaling comes.

Wherein the physical layer signaling may be configured based on a DCI, the DCI may be used for data scheduling including at least one of: UL data scheduling or DL data scheduling; the DCI may be used for group information sending, e.g. a slot format indication, a transmission interrupt indication, a power control parameter indication.

The physical layer signaling may also be configured based on an power saving signal/channel, which indicates power saving configuration information of the UE, and the power saving information may include at least one of: whether to wake up and monitor the PDCCH, whether to sleep and not monitor the PDCCH, whether to monitor F PDCCH units, whether to skip monitoring G PDCCH units, whether to switch BWPs, whether to activate/deactivate carriers, whether to configure dormancy Scell, whether to configure a DRX parameter set, whether to configure a PDCCH aggregation level, whether to configure PDCCH control resource set, whether to configure a PDCCH search space, whether to configure a RRM power saving function, whether to configure CSI, whether to configure SFI, whether to perform an adaptive power adjustment, or whether to perform spatial-domain adaptive power adjustment.

Step 1102: performing a power saving operation in accordance with the time window information.

That is, the UE does not monitor the PDCCH in the preset time period according to the time window information.

Ninth Embodiment

In a seventh embodiment of the present disclosure, the power saving indication method in a network side device is described, and the network side device is further described in conjunction with the appended drawings.

Figure 12:
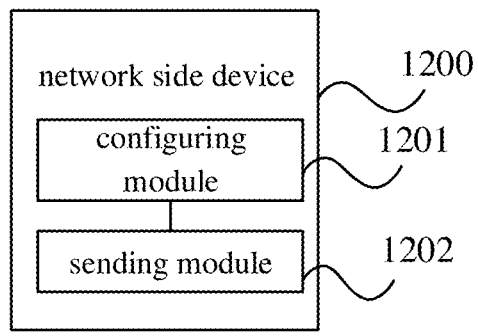
FIG. 12 shows a block diagram of a network side device of a ninth embodiment of the disclosure.

Specifically, as shown in FIG. 12, the network side device 1200 of embodiments of the present disclosure includes the following functional modules: a configuring module 1210, configured to configure time window information for skipping monitoring PDCCH. The time window information is used to instruct the UE to skip monitoring PDCCH in a target time period, the target time period is in a duration from the channel state information request to the channel state information acquisition; a sending module 1220, configured to send the time window information to the UE.

Optionally, the target time period is any one of: a time period between a time unit for triggering channel state indication and a time unit for reporting the channel state indication; a time period between a time unit for triggering the channel state indication and a time unit for sending a reference signal of the channel state indication; a time period between the time unit for sending the reference signal of channel state indication and the time unit for feeding back the channel state indication.

Optionally, the sending the time window information to the UE includes: carrying the time window information on a higher layer signaling and sending the time window information to the UE; or carrying the time window information on a physical layer signaling and sending the time window information to the UE when the transmission time of the physical layer signaling comes.

Optionally, the skipping monitoring PDCCH includes at least one of: skipping monitoring a search space carrying downlink control information in the PDCCH and skipping monitoring a search space carrying uplink control information in the PDCCH.

The network side device embodiments of the present disclosure correspond to the method embodiments described above, and all the implementation means in the method embodiments described above are applicable to the network side device embodiments, with the same technical effects.

Tenth Embodiment

In an eighth embodiment of the present disclosure, the power saving indication method in a UE is described, and the UE is further described in conjunction with the appended drawings.

Figure 13:
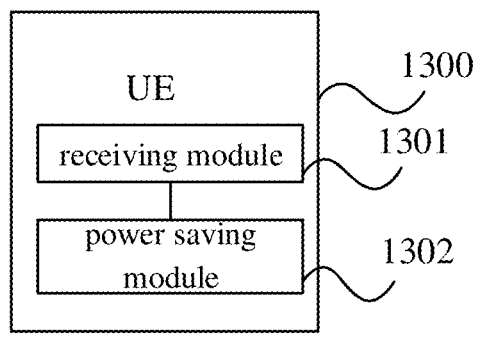
FIG. 13 shows a block diagram of a UE of a tenth embodiment of the disclosure.

In particular, as shown in FIG. 13, the UE 1300 of an embodiment of the present disclosure includes the following functional modules: a receiving module 1310, configured to receive time window information configured by the network side to skip monitoring PDCCH, wherein the time window information is used to instruct the UE to skip monitoring PDCCH in a target time period, the target time period is in a duration from the channel state information request to the channel state information acquisition; and a power saving module 1320, configured to perform a power saving operation in accordance with the time window information.

Optionally, the target time period is any one of: a time period between a time unit for triggering channel state indication and a time unit for reporting the channel state indication; a time period between a time unit for triggering the channel state indication and a time unit for sending a reference signal of the channel state indication; a time period between the time unit for sending the reference signal of channel state indication and the time unit for feeding back the channel state indication.

Optionally, the receiving the time window information configured by the network side to skip monitoring PDCCH includes: receiving higher layer signaling carrying the time window information sent by the network side device; or receiving the physical layer signaling carrying the time window information sent by the network side device.

Optionally, the skip monitoring PDCCH includes at least one of: skipping monitoring a search space carrying downlink control information in the PDCCH and skipping monitoring a search space carrying uplink control information in the PDCCH.

The embodiments of the UE of the present disclosure correspond to the embodiments of the methods described above, and all the implementations in the embodiments of the methods described above are applicable to the embodiments of the user equipment with the same technical effects.

Eleventh Embodiment

Figure 14:
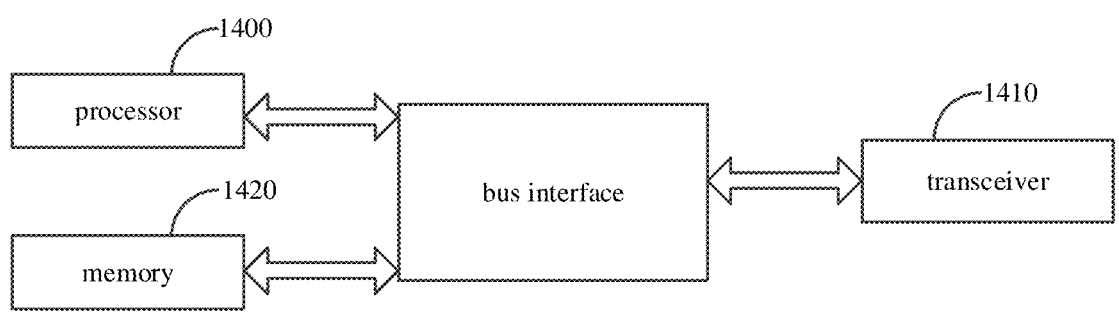
FIG. 14 shows a structural schematic diagram showing a network side device of an eleventh embodiment of the present disclosure.

To better achieve the above objects, as shown in FIG. 14, an eleventh embodiment of the present disclosure further provides a network side device including a processor 1400, a memory 1420 connected to the processor 1400 through a bus interface, and a transceiver 1410 connected to the processor 1400 through the bus interface, the memory 1420 being used to store programs and data used by the processor when performing operations, transmitting data information or pilot through the transceiver 1410 and receiving uplink control channels through the transceiver 1410, and the processor 1400 calls and executes the programs and data stored in the memory 1420 to implement the following functions.

The processor 1400 executes the computer program to perform the following steps: configuring time window information for skipping monitoring PDCCH, wherein the time window information is used to instruct the UE to skip monitoring PDCCH in a target time period, the target time period is in a duration from the channel state information request to the channel state information acquisition; and Sending the time window information to the UE.

Optionally, the target time period is any one of: a time period between a time unit for triggering channel state indication and a time unit for reporting the channel state indication; a time period between a time unit for triggering the channel state indication and a time unit for sending a reference signal of the channel state indication; a time period between the time unit for sending the reference signal of channel state indication and the time unit for feeding back the channel state indication.

Optionally, the sending the time window information to the UE includes: carrying the time window information on a higher layer signaling and sending the time window information to the UE; or carrying the time window information on a physical layer signaling and sending the time window information to the UE when the transmission time of the physical layer signaling comes.

Optionally, the skipping monitoring PDCCH includes at least one of: skipping monitoring a search space carrying downlink control information in the PDCCH and skipping monitoring a search space carrying uplink control information in the PDCCH.

In FIG. 14, the bus architecture may include any quantity of interconnected buses and bridges, specifically various circuits of one or more processors represented by the processor 1400 and memory represented by the memory 1420. The bus architecture may also link various other circuits such as peripherals, voltage regulators, and power management circuits, which are well known in the art, and therefore, will not be described any further herein. The bus interface provides an interface. The transceiver 1410, which may be a number of elements including a transmitter and a transceiver, provides the units for communicating with various other devices over a transmission medium. The processor 1400 is responsible for managing the bus architecture and the general processing, and the memory 1420 may store data used by the processor 1400 in performing operations.

Figure 15:
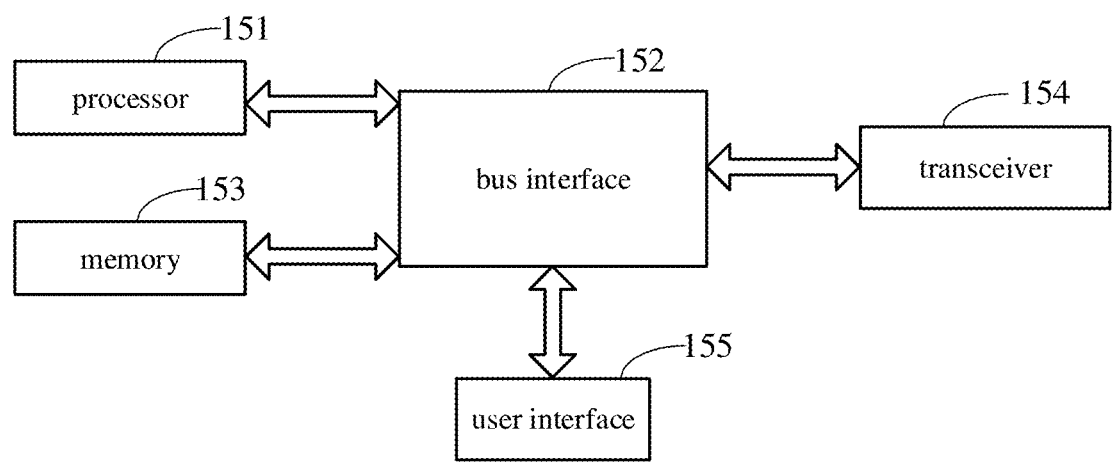
FIG. 15 shows a structural schematic diagram of a UE according to a twelfth embodiment of the present disclosure.

It will be appreciated by those skilled in the art that some or all of the steps for implementing the above-described embodiments may be performed by hardware, or by hardware indicated by a computer program, the computer program include all or part instructions for performing the above described methods, and the computer program may be stored on a readable storage medium, the storage medium may be any form of storage medium Twelfth Embodiment The present embodiment provides a UE as shown in FIG. 15, includes: a processor 151; a memory 153 connected to the processor 151 through a bus interface 152, the memory 153 is used for storing programs and data used by processor 151 in performing operations, the processor 151 calls and executes the programs and data stored in memory 153 to perform the following processes.

Wherein, the transceiver 154 is connected to the bus interface 152 for receiving and transmitting data under control of the processor 151.

In particular, the processor 151 executes the computer program to perform the following steps: receiving time window information configured by the network side to skip monitoring PDCCH, wherein the time window information is used to instruct the UE to skip monitoring PDCCH in a target time period, the target time period is in a duration from the channel state information request to the channel state information acquisition; and performing a power saving operation in accordance with the time window information.

Optionally, the target time period is any one of: a time period between a time unit for triggering channel state indication and a time unit for reporting the channel state indication; a time period between a time unit for triggering the channel state indication and a time unit for sending a reference signal of the channel state indication; a time period between the time unit for sending the reference signal of channel state indication and the time unit for feeding back the channel state indication.

Optionally, the receiving the time window information configured by the network side to skip monitoring PDCCH includes: receiving higher layer signaling carrying the time window information sent by the network side device; or receiving the physical layer signaling carrying the time window information sent by the network side device.

Optionally, the skip monitoring PDCCH includes at least one of: skipping monitoring a search space carrying downlink control information in the PDCCH and skipping monitoring a search space carrying uplink control information in the PDCCH.

In FIG. 15, the bus architecture can include any quantity of interconnecting buses and bridges, in particular various circuits of one or more processors represented by processor 151 and memory represented by memory 153, linked together. The bus architecture can also link various other circuits such as peripherals, voltage regulators, power management circuits, and the like, which are well known in the art, and therefore, which will not be described further herein. The bus interface provides the interface. The transceiver 154, which can be a plurality of units including a transmitter and a transceiver, provides the units for communicating with various other devices over the transmission medium. The user interface 155 can also be an interface capable of interfacing with desired devices including, but not limited to, keypads, displays, speakers, microphones, joysticks, and the like. The processor 151 is responsible for managing the bus architecture and the general processing, and the memory 153 can store data used by the processor 151 in performing the operations.

It will be appreciated by those skilled in the art that some or all of the steps for implementing the above-described embodiments may be performed by hardware, or by hardware indicated by a computer program, the computer program include all or part instructions for performing the above described methods, and the computer program may be stored on a readable storage medium, the storage medium may be any form of storage medium The disclosed embodiments further provide a computer-readable storage medium, on which a computer program is stored, the computer program is executed by a processor to perform the processes of the embodiments of the power saving indication method described above, and the same technical result is achieved, which is not repeated here for the sake of brevity. The computer-readable storage medium described herein may be, for example, ROM (Read-Only Memory), RAM (Random Access Memory), magnetic or optical disks, or the like.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

It is to be understood that the embodiments described in this disclosure may be implemented in hardware, software, firmware, middleware, microcode, or a combination thereof. For a hardware implementation, the various modules, units, sub-units, or sub-modules may be implemented within one or more Application Specific Integrated Circuits (ASICs), Digital Signal Processors (DSPs), Digital Signal processing devices (DSP devices, DSPDs), Programmable Logic Devices (PLDs), Field-Programmable Gate arrays (FPGAs), general purpose processors, controllers, micro-controllers, microprocessors, other electronic units designed to perform the functions described in this disclosure, or a combination thereof.

For a software implementation, the techniques described by embodiments of the disclosure may be implemented with modules (e.g., procedures, functions, and so on) that perform the functions described by embodiments of the disclosure. The software codes may be stored in a memory and executed by a processor. The memory may be implemented within the processor or external to the processor.

The above are optional implementations of the present disclosure. It should be pointed out that for a person skilled in the art, several improvements and modifications can be made without departing from the principles of the present disclosure. These improvements and modifications should also fall within the protection scope of the present disclosure.

What is claimed is:

1. A power saving indication method, comprising:
configuring downlink control information (DCI),
wherein the DCI carries power saving information of at least one user equipment (UE), the power saving information is used to indicate at least one power saving scheme,
wherein the power saving scheme includes at least one of the following:
a fifth power saving scheme of configuring to sleep a secondary serving cell;
a thirteenth power saving scheme of configuring channel state information, CSI; or
a sixteenth power saving scheme of configuring spatial-domain adaptive power adjustment;
wherein when the power saving scheme includes the fifth power saving scheme of configuring the dormant secondary serving cells, the power saving information includes at least one of a quantity of dormant secondary serving cells or an index of the dormant secondary serving cells;
when the power saving scheme includes the thirteenth power saving scheme of configuring channel state information (CSI) the power saving information includes at least one of a quantity of CSI request power saving information and an index of the CSI request power saving information, wherein the CSI request power saving information includes at least one of a CSI parameter set, a CSI resource set, or a mapping relation between the CSI parameter set and the CSI resource set;
when the power saving scheme includes the sixteenth power saving scheme of configuring spatial-domain adaptive power adjustment, the power saving information includes at least one of a quantity of antennas, a quantity of spatial layers, a quantity of codebooks, or binding relationships between the antennas.

2. The power saving indication method according to claim 1, wherein the power saving scheme further includes at least one of the following:
a first power saving scheme of configuring to wake up and monitor physical layer downlink control channel (PDCCH);

a second power saving scheme of configuring to sleep and not monitor PDCCH; or an eighth power saving scheme of configuring discontinuous reception.

3. The power saving indication method according to claim 2, wherein when the power saving scheme includes the first power saving scheme of configuring to wake up and monitor PDCCH, the power saving information includes information indicating to wake up and monitor PDCCH in a preset time period.

4. The power saving indication method according to claim 2, wherein when the power saving scheme includes the second power saving scheme of configuring to sleep and not monitor PDCCH, the power saving information includes information indicating to sleep and not monitor PDCCH in a preset period of time.

5. The power saving indication method according to claim 2, wherein
when the power saving scheme includes the eighth power saving scheme of configuring discontinuous reception, the power saving information includes at least one discontinuous reception configuration parameter or indication information indicating a mapping relation between at least two discontinuous reception configuration parameters.

6. A power saving indication method, comprising:
receiving DCI sent by a network side,
wherein the DCI carries power saving information of at least one UE, the power saving information is used to indicate at least one power saving scheme,
wherein the power saving scheme includes at least one of the following:
a fifth power saving scheme of configuring to sleep a secondary serving cell;
a thirteenth power saving scheme of configuring channel state information, CSI; or
a sixteenth power saving scheme of configuring spatial-domain adaptive power adjustment;
wherein when the power saving scheme includes the fifth power saving scheme of configuring the dormant secondary serving cells, the power saving information includes at least one of a quantity of dormant secondary serving cells or an index of the dormant secondary serving cells;
when the power saving scheme includes the thirteenth power saving scheme of configuring channel state information (CSI) the power saving information includes at least one of a quantity of CSI request power saving information and an index of the CSI request power saving information, wherein the CSI request power saving information includes at least one of a CSI parameter set, a CSI resource set, or a mapping relation between the CSI parameter set and the CSI resource set;
when the power saving scheme includes the sixteenth power saving scheme of configuring spatial-domain adaptive power adjustment, the power saving information includes at least one of a quantity of antennas, a quantity of spatial layers, a quantity of codebooks, or binding relationships between the antennas.

7. The power saving indication method according to claim 6, comprising:
performing a power saving operation in accordance with the power saving information carried in the DCI.

8. The power saving indication method according to claim 7, wherein performing a power saving operation in accordance with the power saving information carried in the DCI comprises:

descrambling the DCI with a predetermined radio network temporary identity (RNTI); and performing the power saving operation in accordance with information obtained after descrambling.

9. The power saving indication method according to claim 8, wherein the DCI includes DCI in one format or DCIs in at least two formats, power saving information carried in DCIs in different formats in the DCIs in at least two formats are different.

10. The power saving indication method according to claim 9, wherein when the DCI includes DCIs in at least two formats, the descrambling the DCI with a predetermined radio network temporary identity comprises:

descrambling the DCIs in different formats in the DCIs in at least two formats using predetermined different RNTIs, respectively.

11. The power saving indication method according to claim 6, wherein the DCI further includes a DCI format identifier for identifying a type of power saving scheme indicated by the power saving information.

12. The power saving indication method according to claim 6, wherein the power saving scheme further includes at least one of the following:

a first power saving scheme of configuring to wake up and monitor physical layer downlink control channel (PDCCH);

a second power saving scheme of configuring to sleep and not monitor PDCCH; or an eighth power saving scheme of configuring discontinuous reception.

13. The power saving indication method according to claim 12, wherein when the power saving scheme includes the first power saving scheme of configuring to wake up and monitor PDCCH, the power saving information includes information indicating to wake up and monitor PDCCH in a preset time period.

14. The power saving indication method according to claim 2, wherein when the power saving scheme includes the second power saving scheme of configuring to sleep and not monitor PDCCH, the power saving information includes information indicating to sleep and not monitor PDCCH in a preset period of time.

15. The power saving indication method according to claim 12, wherein when the power saving scheme includes the eighth power saving scheme of configuring discontinuous reception, the power saving information includes at least one discontinuous reception configuration parameter or indication information indicating a mapping relation between at least two discontinuous reception configuration parameters.

16. A network side device, comprising: a transceiver, a memory, a processor, and a computer program stored on the memory and executed by the processor to perform the power saving indication method according to claim 1.

17. A UE, comprising a transceiver, a memory, a processor, and a computer program stored on the memory and executed by the processor to perform the step of:

receiving a DCI send by a network side, wherein the DCI carries power saving information of at least one UE, the power saving information is used to indicate at least one power saving scheme, wherein the power saving scheme includes at least one of the following:

a fifth power saving scheme of configuring to sleep a secondary serving cell;

a thirteenth power saving scheme of configuring channel state information, CSI; or a sixteenth power saving scheme of configuring spatial-domain adaptive power adjustment;

wherein when the power saving scheme includes the fifth power saving scheme of configuring the dormant secondary serving cells, the power saving information includes at least one of a quantity of dormant secondary serving cells or an index of the dormant secondary serving cells;

when the power saving scheme includes the thirteenth power saving scheme of configuring channel state information (CSI) the power saving information includes at least one of a quantity of CSI request power saving information and an index of the CSI request power saving information, wherein the CSI request power saving information includes at least one of a CSI parameter set, a CSI resource set, or a mapping relation between the CSI parameter set and the CSI resource set;

when the power saving scheme includes the sixteenth power saving scheme of configuring spatial-domain adaptive power adjustment, the power saving information includes at least one of a quantity of antennas, a quantity of spatial layers, a quantity of codebooks, or binding relationships between the antennas.

18. The UE according to claim 17, wherein the power saving scheme includes at least one of the following:

a first power saving scheme of configuring to wake up and monitor physical layer downlink control channel (PDCCH);

a second power saving scheme of configuring to sleep and not monitor PDCCH; or an eighth power saving scheme of configuring discontinuous reception.

19. The UE according to claim 18, wherein when the power saving scheme includes the first power saving scheme of configuring to wake up and monitor PDCCH, the power saving information includes information indicating to wake up and monitor PDCCH in a preset time period.

20. The UE according to claim 18, wherein when the power saving scheme includes the second power saving scheme of configuring to sleep and not monitor PDCCH, the power saving information includes information indicating to sleep and not monitor PDCCH in a preset period of time.

* * * * *